United States Patent
Nakano et al.

(10) Patent No.: US 11,440,557 B2
(45) Date of Patent: Sep. 13, 2022

(54) ELECTRONIC CONTROL DEVICE, RECORDING MEDIUM, AND GATEWAY DEVICE

(71) Applicant: PANASONIC INTELLECTUAL PROPERTY MANAGEMENT CO., LTD., Osaka (JP)

(72) Inventors: Toshihisa Nakano, Osaka (JP); Tohru Wakabayashi, Hyogo (JP); Yusuke Nemoto, Hyogo (JP); Takayuki Fujii, Osaka (JP); Takashi Muroyama, Osaka (JP); Kaoru Yokota, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 375 days.

(21) Appl. No.: 16/422,533

(22) Filed: May 24, 2019

(65) Prior Publication Data
US 2019/0367041 A1  Dec. 5, 2019

(30) Foreign Application Priority Data

May 31, 2018 (JP) .............................. JP2018-104986
May 31, 2018 (JP) .............................. JP2018-105049

(51) Int. Cl.
*B60W 50/00* (2006.01)
*B60W 10/20* (2006.01)
(Continued)

(52) U.S. Cl.
CPC ............ *B60W 50/00* (2013.01); *B60W 10/04* (2013.01); *B60W 10/20* (2013.01); *B60W 30/18* (2013.01);
(Continued)

(58) Field of Classification Search
CPC ...... B60W 50/00; B60W 10/20; B60W 10/04; B60W 30/18; B60W 2556/00;
(Continued)

(56) References Cited

U.S. PATENT DOCUMENTS

2006/0090204 A1* 4/2006 Ogiso ................... B60R 25/20
340/425.5
2008/0219274 A1* 9/2008 Kato .................. H04L 41/0893
370/401
(Continued)

FOREIGN PATENT DOCUMENTS

JP 2004-280489 10/2004
JP 2006-153463 6/2006
(Continued)

OTHER PUBLICATIONS

"Handbook of Driver Assistance Systems—Basic Information, Components and Systems for Active Safety and Comfort", Edition No. 1, Fig.6 & Table 1, Editors: Winner, H., Hakuli, S., Lotz, F., Singer, C. (Eds.), 2016.

*Primary Examiner* — Jonathan M Dager
*Assistant Examiner* — Jean W Charleston
(74) *Attorney, Agent, or Firm* — Greenblum & Bernstein, P.L.C.

(57) ABSTRACT

An electronic control device includes: an acquisition unit that acquires state information indicating at least one of a state of a movable body and a state of an external environment in which the movable body is moving, and a control instruction indicating at least one of a steering control instruction for steering the movable body and an acceleration control instruction for adjusting acceleration of the movable body; and a determining unit that determines whether the control instruction is a false control instruction based on the at least one state indicated by the state
(Continued)

information acquired and control indicated by the control instruction acquired.

21 Claims, 18 Drawing Sheets

(51) Int. Cl.
  *B60W 10/04* (2006.01)
  *B60W 30/18* (2012.01)
  *G06F 21/55* (2013.01)
  *H04L 12/40* (2006.01)

(52) U.S. Cl.
  CPC .......... *G06F 21/552* (2013.01); *G06F 21/554* (2013.01); *H04L 12/40032* (2013.01); *B60W 2556/00* (2020.02); *B60W 2710/20* (2013.01); *B60W 2720/106* (2013.01); *G06F 2221/034* (2013.01); *H04L 2012/40215* (2013.01)

(58) Field of Classification Search
  CPC ....... B60W 2720/106; B60W 2710/20; B60W 60/00188; B60W 2050/0045; B60W 50/045; G06F 21/552; G06F 21/554; G06F 2221/034; G06F 21/44; H04L 12/40032; H04L 2012/40215; H04L 2012/40273
  USPC .......................................................... 710/41
  See application file for complete search history.

(56) References Cited

U.S. PATENT DOCUMENTS

| | | | |
|---|---|---|---|
| 2010/0004818 A1* | 1/2010 | Phelan | G07C 5/008 342/357.57 |
| 2011/0095905 A1* | 4/2011 | Mase | H04L 69/18 340/901 |
| 2011/0231053 A1* | 9/2011 | Kuramochi | H04L 12/40032 701/31.4 |
| 2014/0136014 A1* | 5/2014 | Suzuki | B60W 10/06 701/1 |
| 2014/0142805 A1* | 5/2014 | Frye | B60W 40/09 701/36 |
| 2015/0344039 A1* | 12/2015 | Amoh | B60W 50/0225 701/1 |
| 2016/0101812 A1 | 4/2016 | Niki | |
| 2017/0032671 A1 | 2/2017 | Toyama et al. | |
| 2018/0294991 A1 | 10/2018 | Tsurumi et al. | |
| 2018/0295147 A1 | 10/2018 | Haga et al. | |
| 2018/0316680 A1* | 11/2018 | Kishikawa | H04L 12/40104 |
| 2019/0191020 A1 | 6/2019 | Hamada | |
| 2019/0337526 A1* | 11/2019 | Rave | G06F 21/554 |
| 2019/0367041 A1* | 12/2019 | Nakano | B60W 30/18 |

FOREIGN PATENT DOCUMENTS

| | | |
|---|---|---|
| JP | 2008-114806 | 5/2008 |
| JP | 2016-078490 | 5/2016 |
| JP | 2017-033186 | 2/2017 |
| JP | 2017-111796 | 6/2017 |
| JP | 2017-112594 | 6/2017 |
| JP | 2018-011288 | 1/2018 |
| JP | 2018-046432 | 3/2018 |

* cited by examiner

FIG. 2

FIG. 3
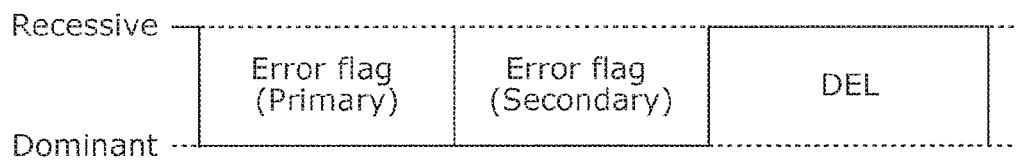
FIG. 4
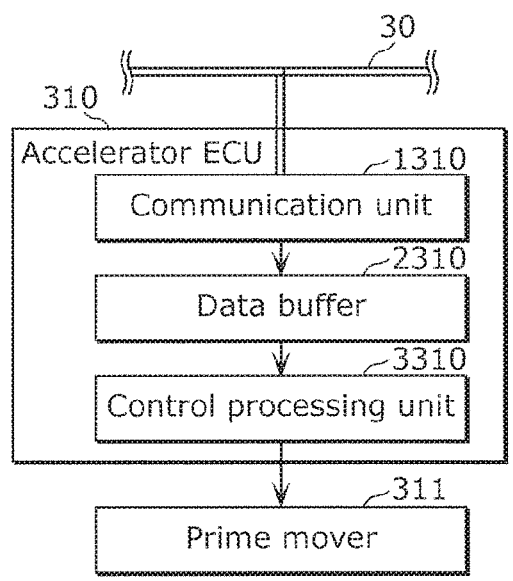
FIG. 5
| Accelerator opening degree | Value (8-bit) |
|---|---|
| 0 | 255 |
| 0.5 | 254 |
| 1 | 253 |
| ⋮ | ⋮ |
| 100 (Maximum value) | 0 |

| Steering angle | Value (8-bit) |
|---|---|
| 30 | 255 |
| 29.5 | 254 |
| 29 | 253 |
| ⋮ | ⋮ |
| 0 | 195 |
| ⋮ | ⋮ |
| -29.5 | 136 |
| -30 | 135 |

ELECTRONIC CONTROL DEVICE, RECORDING MEDIUM, AND GATEWAY DEVICE

CROSS REFERENCE TO RELATED APPLICATIONS

The present application is based on and claims priority of Japanese Patent Application No. 2018-104986 filed on May 31, 2018 and Japanese Patent Application No. 2018-105049 filed on May 31, 2018. The entire disclosures of the above-identified applications, including the specification, drawings and claims are incorporated herein by reference in their entirety.

FIELD

The present invention relates to security technology for dealing with fraudulence regarding, for example, operation control instruction messages of a vehicle which are transmitted in an in-vehicle network in which an electronic control unit that is mounted in the vehicle performs communication.

BACKGROUND

In recent years, the systems in automobiles include a large number of devices called "electronic control units (ECUs)". A network connecting these ECUs is called an "in-vehicle network", Many standards exist for in-vehicle networks. Among such standards, a standard called CAN (Controller Area Network) specified in ISO 11898-1 is one of the most mainstream in-vehicle network standards.

According to the CAN standard, each communication path is a bus (CAN bus) composed of two wires, and an ECU that is connected to a bus is referred to as a "node". Each node connected to a CAN bus transmits and receives frames (messages). A transmitting node that is to transmit a frame applies a voltage to two buses to generate a potential difference between the buses, and thereby transmit the value "1" that is called "recessive" and the value "0" that is called "dominant". When a plurality of transmitting nodes transmit recessive and dominant values at exactly the same timing, the dominant value is prioritized and transmitted. A receiving node transmits a frame called an "error frame" if the format of a received frame is abnormal. An error frame is a frame that notifies the transmitting node or any other receiving nodes that there is an abnormality in a frame by transmitting 6 consecutive dominant bits.

Furthermore, according to the CAN standard, there is no identifier that designates a transmission destination or a transmission source, and instead a transmitting node attaches an ID referred to as a "message ID" to each frame and transmits (that is, sends a signal to a bus) the relevant frame, and each receiving node receives only a predetermined message ID (that is, reads a signal from the bus). In addition, the CAN standard adopts the CSMA/CA (Carrier Sense Multiple Access/Collision Avoidance) scheme, and arbitration based on messages ID is performed at a time of simultaneous transmission by a plurality of nodes so that a frame in which the value of the message ID is smallest is transmitted with priority. In a system in an automobile, each of a large number of ECUs transmits and receives frames containing various kinds of information. For example, the driving assistance functions of an advanced driver assistance system (ADAS) are implemented by the respective ECUs transmitting and receiving frames in a collaborative manner.

Examples of the driving assistance functions include functions relating to control of the vehicle speed, such as a speed maintenance function (cruise control), a following distance maintenance function (adaptive cruise control), and a following distance adjustment function (cooperative adaptive cruise control). To realize these functions, an accelerator ECU that controls the output of a prime mover such as an engine or a motor, a sensor ECU that performs recognition and detection of objects in the area around the vehicle such as a preceding vehicle or lane markings on the road surface and the like, and a speed control assistance ECU that detects a situation in which acceleration is required and outputs a frame of an acceleration control instruction or the like operate in a collaborative manner. Other examples of the driving assistance functions that may be mentioned include functions relating to steering control such as a lane keeping function (lane keeping assist), a parking assistance function (intelligent parking assist), and a lane changing function (lane change assist). To realize these functions, a steering ECU that controls steering, a sensor ECU that detects lane markings such as white lines on a road or in a parking area and detects objects in the surrounding area and the like, and a steering assistance ECU that detects a situation in which steering assistance is required and outputs a frame of a steering control instruction and the like operate in a collaborative manner.

In this connection, there is a risk that an attacker may transmit an attack frame to a CAN bus to perform false control of the automobile by connecting a false node to a CAN bus or by attacking an ECU or the like that has a function for communicating with a portable information terminal or a communication device that is outside the vehicle or the like to thereby change the ECU or the like into an false node. An attack frame is a frame that is transmitted to a CAN bus by a false attacker, and is a frame that originally would not be transmitted (false frame) in a normal state of the in-vehicle network. For example, in a state in which the following distance with respect to a preceding vehicle is short, if a frame of an acceleration control instruction that would cause the vehicle to suddenly accelerate is transmitted to a CAN bus by an attacker, an accident such as a rear-end collision with the preceding vehicle can occur. Further, for example, if a frame containing sensing data that causes the vehicle to incorrectly recognize a traffic lane while traveling is transmitted to a CAN bus by an attacker, due to the occurrence of steering control that is actually not required, an accident may occur as the result of the vehicle deviating from a traffic lane or as the result of confusing the driver or the automatic control system of another vehicle traveling in the vicinity of the vehicle in question.

Known technology for detecting and protecting against the aforementioned kind of attack frame relating to an acceleration control instruction include technology in which a predetermined value with respect to a physical quantity such as a wheel speed or an engine speed detected by a sensor or a numerical value indicating a selective state is registered in advance as a reference, and an abnormality determination with respect to a value included in a frame is performed based on the aforementioned reference (see Patent Literature 1). Further, as technology for detecting and protecting against the aforementioned kind of attack frame relating to a steering control instruction, technology is known in which, with respect to a frame of a message ID showing a result of traffic lane recognition that is transmitted in an in-vehicle network, a determination as to whether or not the frame of the message ID is false is performed based on whether or not the frame of the message ID corresponds to an assumed abnormal form (see Patent Literature 2).

CITATION LIST

Patent Literature

Patent Literature 1: Japanese Unexamined Patent Application Publication No. 2008-114806
Patent Literature 2: Japanese Unexamined Patent Application Publication No. 2016-078490

SUMMARY

Technical Problem

However, the technologies described in each of the aforementioned Patent Literatures are not useful for appropriately dealing with an attack frame of a false operation control instruction that an attacker transmits. For example, in Patent Literature 1, a specific condition that can be used for determining an abnormality in an acceleration control instruction is not disclosed. Further, with the technology disclosed in Patent Literature 2, it is not possible to deal with a case where a false frame that indicates an abnormal steering amount, and not an abnormal result of traffic lane recognition, is transmitted.

Therefore, the present invention provides an electronic control device for monitoring which appropriately deals with an attack frame of a false operation control instruction that is transmitted to a bus of a network (for example, an in-vehicle network) in a movable body by an attacker, a monitoring method, a program that is used for appropriately dealing with the attack frame, a recording medium on which the program is recorded, and a gateway device.

Solution to Problem

In order to solve the above problem, an electronic control device according to one aspect of the present invention includes: an acquisition unit that acquires state information indicating at least one of a state of a movable body and a state of an external environment in which the movable body is moving, and an acceleration control instruction for adjusting acceleration of the movable body; and a determining unit that determines whether the acceleration control instruction is a false control instruction based on the at least one state indicated by the state information acquired and control indicated by the acceleration control instruction acquired.

Moreover, in order to solve the above problem, an electronic control device according to one aspect of the present invention includes: an acquisition unit that acquires state information indicating at least one of a state of a movable body and a state of an external environment in which the movable body is moving, and a steering control instruction for steering the movable body; and a determining unit that determines whether the steering control instruction is a false control instruction based on the at least one state indicated by the state information acquired and control indicated by the steering control instruction acquired.

Moreover, in order to solve the above problem, a monitoring method according to one aspect of the present invention is a monitoring method implemented by an electronic control device and including: acquiring state information indicating at least one of a state of a movable body and a state of an external environment in which the movable body is moving, and an acceleration control instruction for adjusting acceleration of the movable body; and determining whether the acceleration control instruction is a false control instruction based on the at least one state indicated by the state information acquired and control indicated by the acceleration control instruction acquired.

Moreover, in order to solve the above problem, a monitoring method according to one aspect of the present invention is a monitoring method implemented by an electronic control device and including: acquiring state information indicating at least one of a state of a movable body and a state of an external environment in which the movable body is moving, and a steering control instruction for steering the movable body; and determining whether the steering control instruction is a false control instruction based on the at least one state indicated by the state information acquired and control indicated by the steering control instruction acquired.

Moreover, in order to solve the above problem, a recording medium according to one aspect of the present invention is a non-transitory computer-readable recording medium for use in a computer, the recording medium having a computer program recorded thereon for causing the computer to execute: acquiring state information indicating at least one of a state of a movable body and a state of an external environment in which the movable body is moving, and an acceleration control instruction for adjusting acceleration of the movable body; and determining whether the acceleration control instruction is a false control instruction based on the at least one state indicated by the state information acquired and control indicated by the acceleration control instruction acquired.

Moreover, in order to solve the above problem, a recording medium according to one aspect of the present invention is a non-transitory computer-readable recording medium for use in a computer, the recording medium having a computer program recorded thereon for causing the computer to execute: acquiring state information indicating at least one of a state of a movable body and a state of an external environment in which the movable body is moving, and a steering control instruction for steering the movable body; and determining whether the steering control instruction is a false control instruction based on the at least one state indicated by the state information acquired and control indicated by the steering control instruction acquired.

Moreover, in order to solve the above problem, a gateway device according to one aspect of the present invention includes: an acquisition unit that acquires state information indicating at least one of a state of a movable body and a state of an external environment in which the movable body is moving, and an acceleration control instruction for adjusting acceleration of the movable body; a determining unit that determines whether the acceleration control instruction is a false control instruction based on the at least one state indicated by the state information acquired and control indicated by the acceleration control instruction acquired; and a disabling unit that avoids transferring the acceleration control instruction in a case where the determining unit determines that the acceleration control instruction is the false control instruction.

Moreover, in order to solve the above problem, a gateway device according to one aspect of the present invention includes: an acquisition unit that acquires state information indicating at least one of a state of a movable body and a state of an external environment in which the movable body is moving, and a steering control instruction for steering the movable body; a determining unit that determines whether the steering control instruction is a false control instruction based on the at least one state indicated by the state information acquired and control indicated by the steering control instruction acquired; and a disabling unit that avoids transferring the steering control instruction in a case where the determining unit determines that the steering control instruction is the false control instruction.

Advantageous Effects

According to the present invention, it is possible to disable a false frame (attack frame) relating to an operation control instruction that is transmitted to a bus of a network in a movable body.

BRIEF DESCRIPTION OF DRAWINGS

These and other objects, advantages and features of the invention will become apparent from the following description thereof taken in conjunction with the accompanying drawings that illustrate a specific embodiment of the present invention.

FIG. 2 is a view illustrating the format of a data frame specified in the CAN protocol.

FIG. 3 is a view illustrating the format of an error frame specified in the CAN protocol.

FIG. 4 is a block diagram illustrating an example of the configuration of an accelerator ECU according to Embodiment 1.

FIG. 5 is a view for describing one example of control indicated by values in a data field of a data frame relating to an acceleration control instruction that a speed control assistance ECU transmits.

Figure 1:
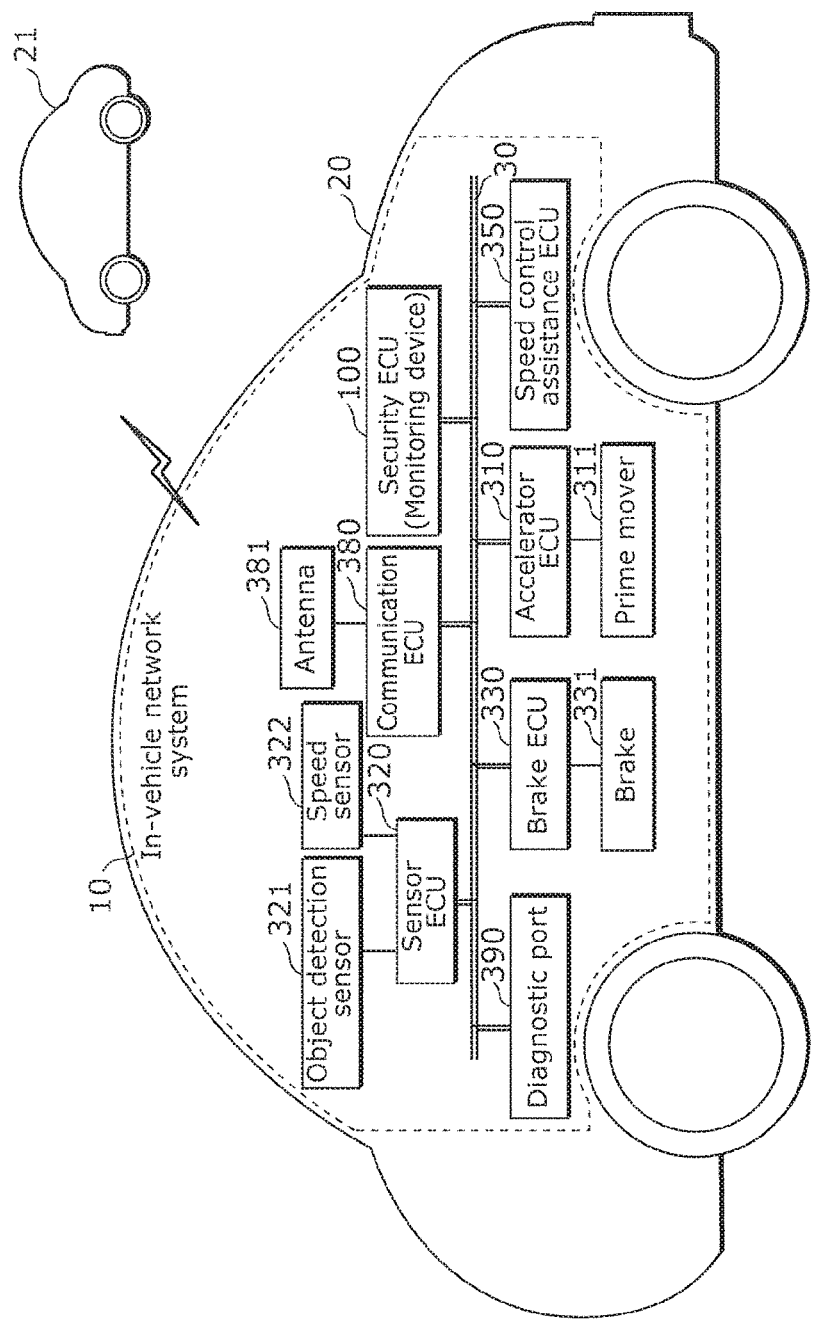
FIG. 1 is a diagram illustrating the overall configuration of an in-vehicle network system according to Embodiment 1.

DESCRIPTION OF EMBODIMENTS (Findings that are the Basis of the Present Invention)

The present invention relates to security technology for dealing with fraudulence with respect to operation control instruction messages of a vehicle. With regard to the findings that were starting point for arriving at the means for solving the problems, among the operation controls the present inventors obtained separate findings with regard to acceleration control and steering control, respectively, and these findings are individually described below,

[Findings Relating to Attack Concerning Acceleration Control Instruction]

In an advanced driver assistance system of a vehicle, a speed control assistance ECU that attempts to keep a vehicle speed and a following distance constant transmits an acceleration control instruction (that is, a frame of an acceleration control instruction) to a CAN bus when a situation has arisen in which acceleration is required, based on information acquired through a communication line of the CAN bus or the like from another ECU on a network that includes a sensor ECU which performs detection of the vehicle speed and the like. In accordance with the acceleration control instruction, an accelerator ECU controls the output of a prime mover such as an engine or a motor to thereby cause the vehicle to accelerate. Note that, in addition to an instruction that increases the output of the prime mover for the purpose of acceleration, the content of an acceleration control instruction may include, for example, an instruction that increases or suppresses the output of the prime mover to maintain the vehicle speed, or an instruction that increases or suppresses the output of the prime mover to adjust the degree of acceleration. In practice, these instructions may be represented, for example, by an accelerator opening degree.

In a case where an attack frame (false frame) of a false acceleration control instruction is transmitted by an attacker, and the false acceleration control instruction contains contents that differs from an authentic acceleration control instruction that a speed control assistance ECU transmits, there is a possibility that the attack frame may lead to the vehicle being involved in an accident or the like. The contents of an authentic acceleration control instruction should be contents that correspond to the state of the vehicle such as the actual speed of the vehicle, a setting made by the driver with respect to vehicle speed, or the driving assistance functions that are enabled in the vehicle, or that correspond to a state of the external environment in which the vehicle is traveling such as a regulation relating to speed at the place the vehicle is traveling through, or the following distance with respect to a preceding vehicle.

Therefore, the present inventors conceived of a method for determining whether an acceleration control instruction that is transmitted to a CAN bus is an authentic acceleration control instruction that is in accordance with such a state of the vehicle or the state of the external environment of the vehicle, or is a false acceleration control instruction whose content is inconsistent with the aforementioned state. Note that, a vehicle is one example of an object to which the method is applied, and the method can also be applied to other movable bodies.

An electronic control device or the like that implements a monitoring device according to one aspect of the present invention executes the aforementioned method to identify a false acceleration control instruction. Further, if an acceleration control instruction is identified as a false acceleration control instruction, the electronic control device disables the false acceleration control instruction to thereby inhibit the execution of acceleration control in accordance with the acceleration control instruction in question. By this means it is possible to prevent an accident that could be caused by an attack frame of the false acceleration control instruction.

In order to solve the above problem, an electronic control device according to one aspect of the present invention includes: an acquisition unit that acquires state information indicating at least one of a state of a movable body and a state of an external environment in which the movable body is moving, and an acceleration control instruction for adjusting acceleration of the movable body; and a determining unit that determines whether the acceleration control instruction is a false control instruction based on the at least one state indicated by the state information acquired and control indicated by the acceleration control instruction acquired. With this, it is possible to determine whether an acceleration control instruction transmitted to a network is a false control instruction based on whether the acceleration control instruction is appropriate in view of a state of a vehicle and a state of an external environment in which the vehicle is moving (hereinafter also collectively referred to as a state of a vehicle etc. with no distinction).

Moreover, for example, the electronic control device may further include a disabling unit that disables or discards the acceleration control instruction in a case where the determining unit determines that the acceleration control instruction is the false control instruction. By this means, execution of acceleration control in accordance with the false acceleration control instruction by the accelerator ECU is inhibited.

Moreover, for example, the determining unit may determine that the acceleration control instruction is the false control instruction in a case where the acceleration control instruction indicates control which is not consistent with the at least one state indicated by the state information. By this means, for example, an acceleration control instruction that is inconsistent with the state of the vehicle or the like is determined as being a false control instruction.

Moreover, for example, the determining unit may determine that the acceleration control instruction is the false control instruction in a case where the at least one state indicated by the state information indicates a set speed of the movable body or a regulation speed at a place that the movable body is moving, and the acceleration control instruction indicates control which causes the movable body to move at a speed exceeding the set speed or the regulation speed. Moreover, for example, the determining unit may determine that the acceleration control instruction is the false control instruction in a case where the at least one state indicated by the state information indicates that information the movable body uses to determine speed control has been received from a preceding movable body with respect to the movable body, and the acceleration control instruction indicates control which is not consistent with the speed control determined. By this means, an acceleration control instruction that causes the vehicle to travel at a speed that exceeds a speed limit that is set by the driver with respect to the vehicle or exceeds an official limit is determined as being a false control instruction.

Moreover, for example, the determining unit may determine that the acceleration control instruction is the false control instruction in a case where the at least one state indicated by the state information indicates a vehicle speed of the movable body or a relative speed with respect to an object that is in a traveling direction of the movable body, and the acceleration control instruction indicates control which causes the movable body to move at a speed exceeding a first predetermined value. Moreover, for example, the determining unit may determine that the acceleration control instruction is the false control instruction in a case where the at least one state indicated by the state information indicates a distance to an object that is in a direction of travel of the movable body, and the acceleration control instruction indicates control which causes the movable body to move at a speed exceeding a first predetermined value that corresponds to the distance to the object. By this means, for example, an acceleration control instruction that causes the vehicle to travel at a speed such that a following distance with a preceding vehicle would become excessively short is determined as being a false control instruction.

Moreover, for example, the determining unit may determine that the acceleration control instruction is the false control instruction in a case where the acceleration control instruction indicates control for causing the moving body to accelerate, and the at least one state indicated by the state information indicates a state that the movable body should be caused to decelerate. By this means, an acceleration control instruction that causes the vehicle to accelerate in a situation in which deceleration is to be executed is determined as being a false control instruction.

Moreover, for example, the determining unit may determine that the acceleration control instruction is the false control instruction in: (1) a case where the at least one state indicated by the state information indicates that an advanced driver assistance system provided in the movable body is off, and the acceleration control instruction indicates control that causes the movable body to move at a speed exceeding a third predetermined value, or (2) a case where the at least one state indicated by the state information indicates that the advanced driver assistance system provided in the movable body is off, and the acquisition unit acquires the acceleration control instruction within a predetermined time period. By this means, in a situation in which an ADAS function is disabled, an acceleration control instruction for which there is a possibility that the acceleration control instruction is masquerading as an acceleration control instruction from the ADAS function is determined as being a false control instruction.

Moreover, a monitoring method according to one aspect of the present invention is a monitoring method implemented by an electronic control device and including: acquiring state information indicating at least one of a state of a movable body and a state of an external environment in which the movable body is moving, and an acceleration control instruction for adjusting acceleration of the movable body; and determining whether the acceleration control instruction is a false control instruction based on the at least one state indicated by the state information acquired and control indicated by the acceleration control instruction acquired. By this means, whether or not an acceleration control instruction that is transmitted to a network is a false control instruction is determined based on whether or not the acceleration control instruction is appropriate in light of the state of the vehicle and the like, and the determination result can be utilized.

Moreover, a recording medium according to one aspect of the present invention is a non-transitory computer-readable recording medium for use in a computer, the recording medium having a computer program recorded thereon for causing the computer to execute: acquiring state information indicating at least one of a state of a movable body and a state of an external environment in which the movable body is moving, and an acceleration control instruction for adjusting acceleration of the movable body; and determining whether the acceleration control instruction is a false control instruction based on the at least one state indicated by the state information acquired and control indicated by the acceleration control instruction acquired. By installing this program in a computer having a processor (microprocessor), and executing the program by means of the processor of the computer, it is appropriately determined whether or not an acceleration control instruction that appears on a bus is false.

Moreover, a gateway device according to one aspect of the present invention includes: an acquisition unit that acquires state information indicating at least one of a state of a movable body and a state of an external environment in which the movable body is moving, and an acceleration control instruction for adjusting acceleration of the movable body; a determining unit that determines whether the acceleration control instruction is a false control instruction based on the at least one state indicated by the state information acquired and control indicated by the acceleration control instruction acquired; and a disabling unit that avoids transferring the acceleration control instruction in a case where the determining unit determines that the acceleration control instruction is the false control instruction. By this means, a gateway device determines whether or not an acceleration control instruction that is transmitted to a network is a false control instruction based on whether or not the acceleration control instruction is appropriate in light of the state of the vehicle and the like, and the determination result can be utilized.

[Findings Relating to Attack Concerning Steering Control Instruction]

In an advanced driver assistance system of a vehicle, a steering assistance ECU for causing the vehicle to take a more suitable course transmits a control instruction (that is, a frame of a steering control instruction) that indicates steering control having an appropriate timing and appropriate contents to a CAN bus, based on information acquired through a communication line such as a CAN bus from other ECUs that include a sensor ECU that detects lane markings on the road surface or objects and the like in the area surrounding the vehicle or in the direction of travel of the vehicle. As a result of the steering ECU controlling steering in accordance with the steering control instruction, the vehicle takes a suitable course. Note that, examples of the content of the steering control instruction include specification of a steering amount by which vehicle wheels are to be steered, and a steering angle that is a turning angle to the left or right of vehicle wheels as the result of steering or as a target. The steering amount and the steering angle are convertible with respect to each other in relation to the actual steering angle, and hereunder, for convenience, the steering amount and steering angle may be referred to as "steering amount" without being particularly distinguished from each other.

In a case where an attack frame (false frame) of a false steering control instruction is transmitted by an attacker, and the contents of the false steering control instruction are contents that differ from an authentic steering control instruction that a steering assistance ECU transmits, there is a possibility that the attack frame may lead to the vehicle being involved in an accident or the like. The contents of an authentic steering control instruction should be contents that correspond to the state of the vehicle such as the speed of the vehicle, or the driving assistance functions that are enabled in the vehicle, or that correspond to in the state of the external environment in which the vehicle is traveling such as the presence/absence of lane markings or an object such as another movable body in the area around the vehicle or a distance to such an object, or regulations to be observed at a place the vehicle is traveling through or the like.

Therefore, the present inventors conceived of a method for determining whether a steering control instruction that is transmitted to a CAN bus is an authentic steering control instruction that is in accordance with such a state of the vehicle or the state of the external environment of the vehicle, or is a false steering control instruction whose content is inconsistent with the aforementioned state. Note that, a vehicle is one example of an object to which the method is applied, and the method can also be applied to other movable bodies.

An electronic control device or the like that implements a monitoring device according to one aspect of the present invention executes the aforementioned method to identify a false steering control instruction. Further, execution of steering control in accordance with the false steering control instruction by a steering ECU is inhibited by disabling the false steering control instruction. By this means it is possible to prevent an accident that could be caused by an attack frame of the false steering control instruction.

An electronic control device according to one aspect of the present invention includes: an acquisition unit that acquires state information indicating at least one of a state of a movable body and a state of an external environment in which the movable body is moving, and a steering control instruction for steering the movable body; and a determining unit that determines whether the steering control instruction is a false control instruction based on the at least one state indicated by the state information acquired and control indicated by the steering control instruction acquired. With this, it is possible to determine whether a steering control instruction transmitted to a network is a false control instruction based on whether the steering control instruction is appropriate in view of a state of a vehicle and a state of an external environment in which the vehicle is moving (hereinafter also collectively referred to as a state of a vehicle etc. with no distinction).

Moreover, for example, the electronic control device may include a disabling unit that disables or discards the steering control instruction in a case where the determining unit determines that the steering control instruction is the false control instruction. By this means, execution of steering control in accordance with the false steering control instruction by the steering ECU is inhibited.

Moreover, for example, the determining unit may determine that the steering control instruction is the false control instruction in a case where the steering control instruction indicates control which is not consistent with the at least one state indicated by the state information. By this means, for example, a steering control instruction that is inconsistent with the state of the vehicle or the like is determined as being a false control instruction.

Moreover, for example, the determining unit may determine that the steering control instruction is the false control instruction in a case where the at least one state indicated by the state information indicates a state that the movable body should move in a first direction, and the steering control instruction indicates control that causes the movable body to move in a second direction that is different from the first direction. By this means, a steering control instruction for steering in a direction that is different from a course that the vehicle should currently take is determined as being a false control instruction.

Moreover, for example, the determining unit may determine that the steering control instruction is the false control instruction in a case where the at least one state indicated by the state information indicates a state that the movable body should be steered by a steering amount that is less than or equal to a first predetermined value, and the steering control instruction indicates control for a steering amount that is greater than the first predetermined value. Moreover, for example, the determining unit may determine that the steering control instruction is the false control instruction in a case where the at least one state indicated by the state information indicates a state that the movable body should be steered by a large steering amount that is greater than or equal to a second predetermined value, and the steering control instruction indicates control for a steering amount that is less than the second predetermined value. By this means, a steering control instruction that causes a change in direction that is too large or too small compared to a change in direction along a course that the vehicle should currently take is determined as being a false control instruction.

Moreover, for example, the determining unit may determine that the steering control instruction is the false control instruction in: (1) a case where the at least one state indicated by the state information indicates a state that the movable body should be moved by manual steering, and the steering control instruction indicates control for a steering amount that is outside a first predetermined range, or (2) a case where the at least one state indicated by the state information indicates a state that the movable body should be moved by manual steering, and the acquisition unit acquires the steering control instruction within a first predetermined time period. By this means, for example, when a mode in which steering is performed by manual control is enabled in relation to automatic driving of the vehicle, a steering control instruction issued by automatic control that significantly changes the content of the manual steering control performed by the driver is determined as being a false control instruction.

Moreover, for example, the determining unit may determine that the steering control instruction is the false control instruction in: (1) a case where the at least one state indicated by the state information indicates a state that the movable body should be moved by automatic steering, and the steering control instruction indicates control for a steering amount that is outside a second predetermined range, or (2) a case where the at least one state indicated by the state information indicates a state that the movable body should be moved by automatic steering, and the acquisition unit fails to acquire the steering control instruction within a second predetermined time period. By this means, for example, when a mode in which steering is performed by automatic control is enabled in relation to automatic driving of the vehicle, a steering control instruction which has not been supposed as the content of steering control performed by automatic control is determined as being a false control instruction.

Moreover, for example, the state information may indicate a state relating to a lane keeping function of the movable body. More specifically, for example, the determining unit may determine that the steering control instruction is the false control instruction in: (1) a case where the state information indicates that the lane keeping function is off, and the steering control instruction indicates control for a steering amount that is outside a third predetermined range, or (2) a case where the state information indicates that the lane keeping function is on and indicates a travel route of the movable body according to the lane keeping function, and the steering control instruction indicates control that specifies steering control that causes the movable body to deviate from the travel route. Moreover, for example, the determining unit may determine that the steering control instruction is the false control instruction in a case where the state information indicates that the lane keeping function is on and indicates a speed of the movable body, and the steering control instruction indicates control for a steering amount that is outside a fourth predetermined range. By this means, a determination as to whether or not a steering control instruction is a false control instruction is appropriately made in accordance with a state relating to whether a lane keeping function that can generate a steering control instruction for steering assistance is enabled or disabled.

Moreover, for example, the state information may indicate a state relating to a parking assistance function of the movable body. More specifically, for example, the determining unit may determine that the steering control instruction is the false control instruction in a case where the state information indicates a target parking position of the movable body according to the parking assistance function, and the steering control instruction indicates control that causes the movable body to move in a direction that is different from a direction toward the target parking position. By this means, a determination as to whether or not a steering control instruction is a false control instruction is appropriately made in accordance with a state relating to whether a parking assistance function that can generate a steering control instruction for steering assistance is enabled or disabled.

Moreover, for example, the state information may indicate a state relating to a lane changing function of the movable body. More specifically, for example, the determining unit may determine that the steering control instruction is the false control instruction in: (1) a case where the state information indicates a state that a traffic lane in which the movable body moves should be changed to an adjacent traffic lane in a first direction, and the steering control instruction indicates control that causes the movable body to move in a second direction that is different from the first direction, or (2) a case where the state information indicates a state that a traffic lane in which the movable body moves should be changed, and the steering control instruction indicates control that specifies a steering amount that keeps the movable body in the traffic lane in which the movable body is moving. By this means, a determination as to whether or not a steering control instruction is a false control instruction is appropriately made in accordance with a state relating to whether a lane changing function that can generate a steering control instruction for steering assistance is enabled or disabled.

Moreover, a monitoring method according to one aspect of the present invention is a monitoring method implemented by an electronic control device and including: acquiring state information indicating at least one of a state of a movable body and a state of an external environment in which the movable body is moving, and a steering control instruction for steering the movable body; and determining whether the steering control instruction is a false control instruction based on the at least one state indicated by the state information acquired and control indicated by the steering control instruction acquired. By this means, whether or not a steering control instruction that is transmitted to a network is a false control instruction is determined based on whether or not the steering control instruction is appropriate in light of the state of the vehicle and the like, and the determination result can be utilized.

Moreover, a recording medium according to one aspect of the present invention is a non-transitory computer-readable recording medium for use in a computer, the recording medium having a computer program recorded thereon for causing the computer to execute: acquiring state information indicating at least one of a state of a movable body and a state of an external environment in which the movable body is moving, and a steering control instruction for steering the movable body; and determining whether the steering control instruction is a false control instruction based on the at least one state indicated by the state information acquired and control indicated by the steering control instruction acquired. By installing this program in a computer having a processor (microprocessor), and executing the program by means of the processor of the computer, it is appropriately determined whether or not a steering control instruction that appears on a bus is false.

Moreover, a gateway device according to one aspect of the present invention includes: an acquisition unit that acquires state information indicating at least one of a state of a movable body and a state of an external environment in which the movable body is moving, and a steering control instruction for steering the movable body; a determining unit that determines whether the steering control instruction is a false control instruction based on the at least one state indicated by the state information acquired and control indicated by the steering control instruction acquired; and a disabling unit that avoids transferring the steering control instruction in a case where the determining unit determines that the steering control instruction is the false control instruction. By this means, a gateway device determines whether or not an acceleration control instruction that is transmitted to a network is a false control instruction based on whether or not the acceleration control instruction is appropriate in light of the state of the vehicle and the like, and the determination result can be utilized.

It should be noted that these general or specific embodiments may be implemented as a system, a method, an integrated circuit, a computer program, or a computer-readable recording medium such as a CD-ROM, or may be implemented as any combination of the system, the method, the integrated circuit, the computer program, or the recording medium.

In the following, a monitoring device that executes a monitoring method and the like according to embodiments will be described with reference to the drawings. The embodiments described below each shows a specific example in the present invention. Thus, the numerical values, constituent elements, the arrangement and connection forms of the constituent elements, steps (processes), the processing order of the steps, and the like described in the following embodiments are mere examples, and do not limit the scope of the present invention. Among the constituent elements in the following embodiments, constituent elements not recited in any one of the independent claims are constituent elements that can be optionally added. In addition, the drawings are schematic and not necessarily representative of exact proportions or dimensions.

In each of the embodiments hereunder, the present invention is described as a security countermeasure in an in-vehicle network mounted in an automobile, however the scope of application of the present invention is not limited thereto. The present invention is not limited to an automobile, and may be applied to a movable body network provided for various kinds of movable bodies, such as construction machinery, agricultural machinery, ships and vessels, railroads, and airplanes. It will be understood that when applying the technology described hereunder to ships and vessels or airplanes, the term "traveling" is appropriately read as "sailing" or "flying", and "traffic lane" is appropriately read as "movement route" or the like.

Embodiment 1

Hereunder, as one embodiment of the present invention, an in-vehicle network system having a security ECU (monitoring device) that disables a frame relating to a false acceleration control instruction that is transmitted to a bus (CAN bus) constituting part of an in-vehicle network in a vehicle as one example of a movable body is described using the accompanying drawings.

[1.1 Configuration of in-Vehicle Network System 10]

FIG. 1 is a diagram illustrating the overall configuration of an in-vehicle network system 10 according to the present embodiment.

As illustrated in FIG. 1, the in-vehicle network system 10 is configured to include various ECUs (a security ECU 100, an accelerator ECU 310, a sensor ECU 320, a brake ECU 330, a speed control assistance ECU 350, and a communication ECU 380) and a bus (CAN bus) 30 that are mounted in a vehicle 20. Note that, apart from the aforementioned ECUs, the in-vehicle network system 10 can also include other ECUs such as an ECU involved in the control of steering, although such ECUs are not illustrated in FIG. 1. Further, the in-vehicle network system 10 may constitute a control network system for the vehicle 20 together with a server apparatus or the like which is outside the vehicle and which any of the ECUs, including ECUs which are not illustrated in FIG. 1, communicates through a communication network such as the Internet. Note that, it is possible that a communication path with the outside may be utilized for a cyber-attack on the in-vehicle network system 10 as an infiltration path for introducing (transmitting) a false frame into the in-vehicle network system 10 or for hijacking one of the ECUs.

Each ECU in the in-vehicle network system 10 is a device including, for example, a processor (microprocessor), digital circuits such as a memory, analog circuits, a communication circuit, and so forth. The memory is a ROM (Read-Only Memory), a RAM (Random Access Memory), or the like, and is capable of storing a control program (computer program as software) that is executed by the processor. For example, the processor operates in accordance with the control program (computer program), thereby allowing the ECU to implement various functions. The computer program is constituted by combining a plurality of instruction codes indicating instructions for the processor to achieve a predetermined function. These ECUs are capable of transmitting and receiving frames through the bus 30 in accordance with the CAN protocol.

Some of the ECUs in the in-vehicle network system 10 are connected to various devices such as a sensor, an actuator, or a user interface device by a communication path other than the bus 30. For example, the accelerator ECU 310 is connected to (a throttle, fuel injection device, motor driving circuit, or the like of) a prime mover 311, and controls the prime mover 311. The brake ECU 330 is connected to (an actuator of) a brake 331, and controls the brake 331. Note that, illustration of the individual actuators and the like that control the respective constituent elements described above is omitted from FIG. 1, and hereunder, to simplify the description, a control instruction with respect to an actuator or the like is sometimes described as a control instruction with respect to the relevant constituent element. The communication ECU 380 is connected to an antenna 381, and performs communication with outside of the in-vehicle network system 10 via the antenna 381. In FIG. 1, another vehicle 21 is illustrated as an example of a communication counterpart. That is, vehicle-to-vehicle communication is implemented by means of the communication ECU 380. Further, the sensor ECU 320 is connected to an object detection sensor 321 and a speed sensor 322, and periodically transmits frames (data frames) representing measurement information measured by each sensor to the bus 30. In the in-vehicle network system 10, although a plurality of the sensor ECUs 320 may be provided in correspondence with the respective sensors, for convenience in the description an example is described in which there is a single sensor ECU 320 that can transmit frames that represent measurement information measured by each of the plurality of sensors. However, it is not necessary that all of the sensors in the in-vehicle network system 10 are connected to the sensor ECU 320, and there may be sensors that are connected to an ECU other than the sensor ECU 320, such as the accelerator ECU 310 or the engine ECU 340. The object detection sensor 321 detects detection objects such as a vehicle, an obstacle, a passerby, and lane markings on the road surface in the area around or the direction of travel of the vehicle 20. The object detection sensor 321 also measures a distance between the vehicle 20 and the detection object and the like. More specifically, for example, the object detection sensor 321 can be implemented by a camera (image sensor) such as a camera that photographs the frontward direction, lateral directions, rearward direction or the entire surrounding area of the vehicle 20, or by radar or LiDAR, or by a combination of these methods. The speed sensor 322 is a sensor for detecting the speed of the vehicle 20. Although in this case the term "speed of the vehicle 20" refers to, for example, the absolute speed of the vehicle 20, it may refer to the relative speed of the vehicle 20 with respect to a detection object which the object detection sensor 321 detected. Note that, the absolute speed of the vehicle 20 is equal to the relative speed of the vehicle 20 with respect to a detection object which is not moving.

The speed control assistance ECU 350 is an ECU that performs a speed control assistance function of the advanced driver assistance system. In order to request the accelerator ECU 310 to perform acceleration control, the speed control assistance ECU 350 periodically transmits a frame of an acceleration control instruction having control that is determined based on information acquired from other ECUs, such as measurement information acquired from the sensor ECU 320, to the bus 30. Note that, the speed control assistance ECU 350 may be integrated with or directly connected to another ECU such as the sensor ECU 320, for example, and may acquire various kinds of information such as measurement information without receiving the information through the bus 30. Further, a direct connection between the speed control assistance ECU 350 and another ECU may be performed through a dedicated line.

A diagnostic port 390 is a terminal that is connected to the bus 30, such as an OBD 2 (On-Board Diagnostics 2), and access to the bus 30 by a device such as a diagnostic tool (fault diagnosis tool) is possible through the diagnostic port 390.

The communication ECU 380 and the diagnostic port 390 can also be utilized for an attack on the in-vehicle network system 10.

The security ECU 100 performs a function of ensuring the security of the in-vehicle network system 10. In the present embodiment, the security ECU 100 is a device that monitors frames that flow through the bus 30 and, by transmitting an error frame, disables a data frame relating to a false acceleration control instruction that appears on the bus 30, and thereby functions as a monitoring device that deals with attack frames of false acceleration control instructions. Note that the security ECU 100 may have a function that determines whether or not a data frame on the bus 30, and not just a frame of a false acceleration control instruction, is false using another certain condition, and disables a false data frame.

[1.2 Data Frame Format]

The data frame (message), which is one of the frames used in a network compliant with the CAN protocol, will now be described.

Figure 2:
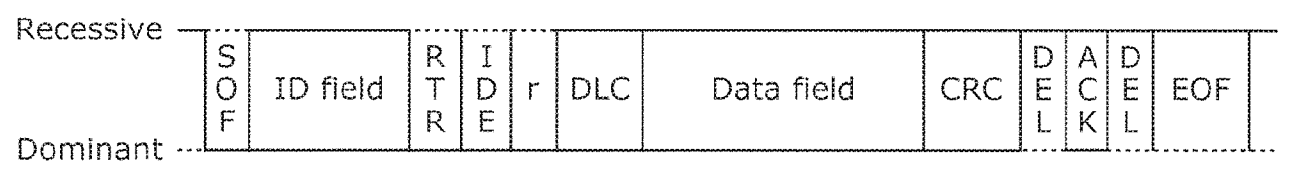

FIG. 2 is a diagram illustrating the format of a data frame specified in the CAN protocol. In this figure there is illustrated a data frame in the standard ID format specified in the CAN protocol. The data frame is made up of the following fields: SOF (Start Of Frame), ID field, RTR (Remote Transmission Request), IDE (Identifier Extension), reserved bit "r", DLC (Data Length Code), data field, CRC (Cyclic Redundancy Check) sequence, CRC delimiter "DEL", ACK (Acknowledgement) slot, ACK delimiter "DEL", and EGF (End Of Frame).

The SOF consists of one dominant bit. The recessive value is set for a state where a bus is idle in which no message is being transmitted, and is changed to the dominant value by the ECU that is the transmitting node to notify the start of frame transmission.

The ID field is made up of 11 bits, and is a field for storing an ID (message ID) that is a value indicating a type of data. When a plurality of nodes simultaneously start transmission, communication arbitration is performed that places priority on the frame whose ID has the smallest value.

The RTR is a value for identifying a data frame, and a remote frame that is to be used for a data frame request, and is made up of one dominant bit for a data frame.

The IDE and "r" are both made up of one dominant bit.

The DLC is made up of 4 bits, and is a value indicating the length of the following data field. The IDE, "r", and the DLC are collectively referred to as a control field.

The data field is composed of up to 64 bits, and includes the content of data to be transmitted by the frame. The length is variable in units of 8 bits. The specification of data is not specified in the CAN protocol, and can be decided by the designer. Accordingly, the specification of the data in the in-vehicle network system is dependent on the type of vehicle, the manufacturer (producer), and so forth.

The CRC sequence is made up of 15 bits. A result obtained by a calculation performed by the transmitting node using transmission values of the SOF, the ID field, the control field, and the data field is entered as the value for the CRC sequence. The receiving node calculates a value in the same way when these fields are received, and checks the calculated result against the value of the CRC sequence to determine whether the frame was received correctly.

The CRC delimiter is a delimiter made up of one recessive bit, indicating the end of the CRC sequence. The CRC sequence and the CRC delimiter are collectively referred to as a CRC field.

The ACK slot is made up of 1 bit. A transmitting node sets the recessive value in the ACK slot when transmitting the frame. If a receiving node has been able to correctly receive the frame up to the CRC sequence, the receiving node sets the dominant value as an acknowledgement and transmits the frame during the ACK slot. Since the dominant value overrides the recessive value, if the ACK slot is constituted by the dominant value after transmission, the transmitting node can confirm that some receiving node connected to the CAN bus correctly received the frame.

The ACK delimiter is a delimiter made up of one recessive bit, indicating the end of the ACK.

The EOF is made up of 7 recessive bits, and indicates the end of the data frame.

[1.3 Error Frame Format]

FIG. 3 is a diagram illustrating the format of an error frame specified in the CAN protocol. The error frame is constituted by an error flag (primary), an error flag (secondary), and an error delimiter.

The error flag (primary) is used to inform any other node of the occurrence of an error. A node that has detected an error transmits 6 consecutive dominant bits in order to inform any other node of the occurrence of the error. This transmission violates a bit-stuffing rule (according to which the same value should not be transmitted over 6 or more consecutive bits) in the CAN protocol, and induces the transmission of an error frame (secondary) from any other node.

The error flag (secondary) is made up of 6 consecutive dominant bits, and is used to inform any other node of the occurrence of an error. All the nodes that have received the error flag (primary) and detected the violation of the bit-stuffing rule transmit an error flag (secondary).

The error delimiter "DEL" is made up of 8 consecutive recessive bits, and indicates the end of the error frame.

[1.4 Configuration of Accelerator ECU 310]

FIG. 4 is a block diagram illustrating a configuration example of the accelerator ECU 310. The accelerator ECU 310 for controlling the prime mover 311 includes a communication unit 1310, a data buffer 2310, and a control processing unit 3310.

The communication unit 1310 is an integrated circuit (for example, a communication circuit, a memory, or a processor) that controls communication with respect to the bus 30. The communication unit 1310 includes, for example, a frame transceiving function unit and a received frame interpretation function unit as functional constituent elements.

The frame transceiving function unit, for example, carries out the transmission and receiving of frames with respect to the bus 30 in accordance with the CAN protocol (sequential transmission and receiving of frames bit-by-bit).

In the received frame interpretation function unit, interpretation of the values of a frame that the frame transceiving function unit received is performed so as to map the values into the respective fields in the frame formats specified in the CAN protocol. Based on a value determined as the value of the ID field, the received frame interpretation function unit determines whether or not the frame is a data frame (message) which the accelerator ECU 310 should receive, and if the ID is not an ID of a frame that should be received, the received frame interpretation function unit aborts interpretation of the relevant frame. Further, in a case where the received frame interpretation function unit determines that a frame does not comply with the CAN protocol, for example, if the values of the CRC do not match or if an item whose value should be fixed to the dominant value has the recessive value, the received frame interpretation function unit transmits an error frame to the frame transceiving function unit. Further, when an error frame is received, that is, when it is interpreted that a received frame is an error frame based on a value in the received frame, the received frame interpretation function unit discards the subsequent part of the frame, that is, aborts interpretation of the frame. In a case where the ID of the received data frame is an ID indicating that the data frame is a frame of an acceleration control instruction that is determined in advance by the specifications of the in-vehicle network system 10, the received data frame is determined as being a data frame that should be received by the received frame interpretation function unit of the communication unit 1310. The received frame interpretation function unit stores the contents (ID, and data in the data field, and so forth) of the frame that is determined as being a data frame that should be received, in the data buffer 2310.

The data buffer 2310 is one storage area of a storage medium such as a memory or a register. An ID, and information indicated by values in the data field (for example, information indicating an acceleration control instruction) as the contents of a data frame received by the communication unit 1310 are stored in the data buffer 2310. Communication arbitration is performed by means of IDs at a time of simultaneous transmission of data frames from a plurality of nodes onto the bus 30. Therefore, a timing at which the accelerator ECU 310 receives, from the bus 30, a data frame relating to an acceleration control instruction that the speed control assistance ECU 350 transmits does not necessarily exactly match a constant period (for example, 50 ms), and in some cases may deviate somewhat from the constant period. In the accelerator ECU 310, the data buffer 2310 is used so as to deal with fluctuations in the reception timing that arise due to such effects of the communication arbitration, and so that received data frames can be efficiently processed.

The control processing unit 3310 acquires the contents (information indicating an acceleration control instruction or the like) of a frame stored in the data buffer 2310 periodically or when a certain condition (a condition associated with storing of frames in the data buffer 2310 or the like) is established or the like, and controls the prime mover 311 by transmitting a control signal to the prime mover 311 in accordance with the acceleration control instruction that is indicated by the acquired information.

Note that, the ECUs that can control an actuator, such as the brake ECU 330, include a communication unit, a data buffer, and a control processing unit for controlling the actuator. Further, with regard to the sensor ECU 320 that is connected to a sensor, the sensor ECU 320 includes a processing unit that acquires a measurement result obtained at the sensor and generates a data frame to which a predetermined message ID is added and which includes measurement information that indicates the relevant measurement result in the data field, and a communication unit for transmitting the data frame to the bus 30 in accordance with the CAN protocol, and the like. The measurement information shows a measurement result relating to, for example, a recognition result regarding recognition of a detection object, the distance between the vehicle 20 and the detection object, and the speed of the vehicle 20. Note that, in a case where an ECU that is other than the sensor ECU 320 is connected to a sensor, the ECU in question can include the same kind of constituent elements that the sensor ECU 320 includes. Further, with regard to the communication ECU 380 that is connected to an antenna, the communication ECU 380 includes a radio communication unit that receives communication data from outside of the in-vehicle network system 10, a processing unit that extracts information that is to be transferred to the in-vehicle network system 10 from the received communication data and generates a data frame including the aforementioned information in the data field and adding a predetermined message ID thereto, and a CAN communication unit for transmitting the data frame to the bus 30 in accordance with the CAN protocol, and the like. The information that is included in and transmitted with the data frame is information indicating, for example, the status of travel control of the vehicle 21, measurement results obtained by measurement performed by sensors of the vehicle 21, and the state in the external environment in which the vehicle 20 is traveling.

[1.5 Acceleration Control Instruction]

FIG. 5 is a view illustrating an example of the data field of a frame relating to an acceleration control instruction that the speed control assistance ECU 350 transmits. In this example, specification of an output with respect to the prime mover 311 is included in the data field of the frame of the acceleration control instruction, and in FIG. 5 an example of the correspondence with the values in the data field and the accelerator opening degree is illustrated. Note that, in this case the accelerator opening degree is an example of a parameter which the speed control assistance ECU 350 causes the accelerator ECU 310 to specify and use to control the output of the prime mover 311, and is not an opening degree that is in accordance with the actual position of an accelerator pedal that the driver operates. Although information other than the accelerator opening degree may also be added in the data field of the frame of the acceleration control instruction, in this example, for convenience in the description, the description will focus only on the accelerator opening degree. In this example, the accelerator opening degree is represented by an 8-bit value, with a value of "255" (11111111) indicating an accelerator opening degree of 0, and a value of "55" (00110111) indicating the maximum value (100 in this example) of the accelerator opening degree, and the values therebetween indicating outputs in increments of 0.5 degrees.

When the accelerator ECU 310 receives an acceleration control instruction that includes a specification with respect to the accelerator opening degree from the speed control assistance ECU 350, the accelerator ECU 310 actuates the prime mover 311 in accordance with the accelerator opening degree. As a more specific example, when the accelerator opening degree specified by the acceleration control instruction is the maximum amount (100 in this example), the control processing unit 3310 of the accelerator ECU 310 actuates the prime mover 311 by transmitting a control signal that is the same as in a case where the accelerator pedal has been fully depressed. Further, when an acceleration control instruction specifying an accelerator opening degree of zero is received from the speed control assistance ECU 350, the control processing unit 3310 of the accelerator ECU 310 transmits a control signal that is the same as in a case where the accelerator pedal is not depressed to the prime mover 311. Note that, with respect to control of the prime mover 311 that reflects an operation of the accelerator pedal by the driver, and control of the prime mover 311 in accordance with an acceleration control instruction from the speed control assistance ECU 350, in some cases the accelerator ECU 310 may give priority to one of these controls over the other of these controls, in accordance with settings relating to automatic control of acceleration of the vehicle 20 and the like.

[1.6 Configuration of Security ECU 100]

Figure 6:
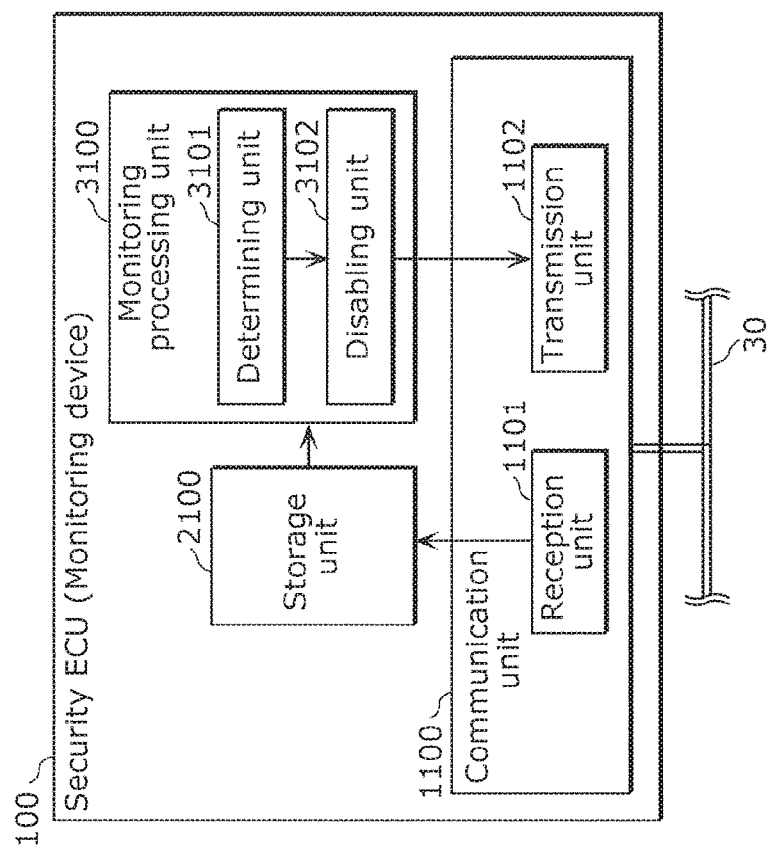
FIG. 6 is a block diagram illustrating an example of the configuration of a security ECU (monitoring device) relating to Embodiments 1 and 2.

FIG. 6 is a block diagram illustrating a configuration example of the security ECU 100. The security ECU 100 has a function as a control device that monitors the flow of frames on the bus 30 and, by transmission of an error frame, disables a data frame relating to a false acceleration control instruction that appears on the bus 30. To realize this function, the security ECU 100 includes a communication unit 1100, a storage unit 2100, and a monitoring processing unit 3100. The respective functions of each of these constituent elements are implemented by, for example, a communication circuit, a storage medium such as a memory, and a processor or digital circuit that executes a control program stored in the memory, or the like that are provided in the security ECU 100.

The communication unit 1100 is implemented by a communication circuit, and a processor that executes a control program or the like. The communication unit 1100 includes a reception unit 1101 and a transmission unit 1102 for transmitting and receiving frames to and from the bus 30 in accordance with the CAN protocol (sequential transmission and receiving of frames bit-by-bit). The reception unit 1101 receives frames from the bus 30. When a frame from the bus 30 is received by the reception unit 1101, the communication unit 1100 performs interpretation so as to map the values of the frame into the respective fields in the frame format specified in the CAN protocol, and thereby distinguishes the ID (message ID), the DLC, and the data in the data field, respectively, and extracts these items of information from the frame. By referring to IDs that are determined in advance by the specifications of the in-vehicle network system 10, the communication unit 1100 determines whether the extracted ID is the ID of a frame that the security ECU 100 should receive. If the ID is not the ID of a frame that the security ECU 100 should receive, the communication unit 1100 aborts interpretation of the frame. The reception unit 1101 is an example of an acquisition unit in the present embodiment. The communication unit 1100 stores the contents (ID, data, and the like) of the frame that were acquired by interpreting the frame which the reception unit 1101 received, in the storage unit 2100. Further, upon receiving an instruction to transmit an error frame from the monitoring processing unit 3100, the communication unit 1100 transmits an error frame to the bus 30 by means of the transmission unit 1102.

The frames that the security ECU 100 should receive include the frame of an acceleration control instruction that is transmitted from the speed control assistance ECU 350. Further, a frame indicating at least one kind of information among information indicating the state of the vehicle 20 and information indicating the state of the external environment in which the vehicle 20 is traveling (hereunder, information indicating at least one of these states is also referred to as "state information") is also received by the security ECU 100. A data frame indicating an enabled (on) or disabled (off) speed control assistance function that is transmitted from the speed control assistance ECU 350 may be mentioned as an example of a frame that indicates the state of the vehicle 20. Further, a data frame indicating whether various kinds of assistance functions of the advanced driver assistance system that also include functions other than the speed control assistance function are enabled (on) or disabled (off), as well as setting values that were set by the driver or various functions may also be mentioned as an example of a frame that indicates the state of the vehicle 20. Further, a data frame indicating the current accelerator opening degree that is transmitted from the accelerator ECU 310 can also be received by the security ECU 100 as a frame indicating state information that shows the state of the vehicle 20. The security ECU 100 also receives data frames including measurement information that are transmitted from other ECUs, such as the sensor ECU 320. Depending on the measurement target, the kinds of measurement information include information indicating the state of the vehicle 20 (for example, the vehicle speed, water temperature, and voltage), and information indicating the state of the external environment (for example, the air temperature outside the vehicle, the state of the road surface, and a result of object recognition). In addition, the security ECU 100 also receives information that the communication ECU 380 acquires by communication with the vehicle 21 and transfers to the in-vehicle network system 10 (for example, the status of travel control of the vehicle 21, and measurement results obtained by measurement by sensors in the vehicle 21). This information is information that indicates the state of the external environment of the vehicle 20.

The storage unit 2100 is one storage area of a storage medium such as a memory for storing the contents of frames received by the reception unit 1101. For example, the aforementioned state information, that is, measurement information transmitted from the sensor ECU 320 and the like, information regarding the speed control assistance function that is enabled or disabled which is transmitted from the speed control assistance ECU 350, information indicating the current accelerator opening degree that is transmitted from the accelerator ECU 310, and information provided from the vehicle 21 that is transmitted from the communication ECU 380 is stored in the storage unit 2100.

The monitoring processing unit 3100 is implemented by a processor that executes a control program or the like, and performs a function of executing disabling processing that disables the data frame of an acceleration control instruction on the bus 30 under certain conditions. The monitoring processing unit 3100 includes a determining unit 3101 and a disabling unit 3102.

When the reception unit 1101 receives the data frame of an acceleration control instruction, the determining unit 3101 determines whether or not the acceleration control instruction is false (that is, whether or not the data frame of the relevant acceleration control instruction is a false frame that should be disabled) based on at least one of the state of the vehicle 20 and the state of the external environment in which the vehicle 20 is traveling, as well as the relevant acceleration control instruction. The determining unit 3101 makes this determination based on the at least one state indicated by the state information that is received by the reception unit 1101 and is stored the storage unit 2100, and the control indicated by the acceleration control instruction received by the reception unit 1101. This determination is made before a time that all of the data frame of the acceleration control instruction has been received from the bus 30 by the reception unit 1101 (that is, before the end of the data frame, for example, immediately after reception of the data field or immediately after reception of the CRC sequence). In a case where the determining unit 3101 determines that the acceleration control instruction is false, the determining unit 3101 outputs a result to that effect to notify the disabling unit 3102.

In a case where it is determined by the determining unit 3101 that an acceleration control instruction is false, the disabling unit 3102 performs disabling processing that causes the transmission unit 1102 to transmit an error frame to the bus 30 to disable the data frame of the acceleration control instruction that appears on the bus 30. This disabling processing by the disabling unit 3102 is implemented by transmission of an error frame to the bus 30 prior to completing reception of the end of the data frame (EOF) of the acceleration control instruction. When the disabling processing is performed, the data frame of the acceleration control instruction on the bus 30 is overwritten, and hence the data frame of the false acceleration control instruction is discarded by the accelerator ECU 310. Thus, acceleration control in accordance with the acceleration control instruction is avoided.

[1.7 Determination of False Acceleration Control Instruction]

Hereunder, a method by which the determining unit 3101 of the monitoring processing unit 3100 in the aforementioned security ECU 100 (monitoring device) determines whether or not an acceleration control instruction is false will be described.

The determining unit 3101 determines that an acceleration control instruction is a false control instruction in a case where, based on control indicated by the acceleration control instruction that is acquired from a data frame received by the reception unit 1101, and a state indicated by state information that is stored in the storage unit 2100, the acceleration control instruction indicates control that is not consistent with the state indicated by the state information, that is, the state and the control are inconsistent with each other. Hereunder, such kind of inconsistency between the state and the control will be described using an example.

[1.7.1 Inconsistency Between Settings and Speed Limit]

For example, in a case where the state that the state information indicates is the set speed of the vehicle 20, and an acceleration control instruction indicates control that causes the vehicle 20 to travel at a speed that exceeds the set speed, the determining unit 3101 determines that the acceleration control instruction is inconsistent with the state that the state information indicates and is a false control instruction.

Here, the term "set speed" refers to a speed that, for example, the driver set by enabling a speed maintenance function. In addition, the set speed may be a speed that is set by a speed control assistance function when a speed control assistance function such as a following distance maintenance function or a following distance adjustment function is enabled in the vehicle 20. These set speeds are examples of states of the vehicle 20. The security ECU 100 can acquire state information indicating such a state from a data frame indicating the setting status of a speed control assistance function that is transmitted from the speed control assistance ECU 350.

Further, in a case where the state that the state information indicates is a regulation speed at a location which the vehicle 20 is traveling through, and an acceleration control instruction indicates control that causes the vehicle 20 to travel at a speed that exceeds the regulation speed, the determining unit 3101 determines that the acceleration control instruction is inconsistent with the state that the state information indicates and is a false control instruction.

Here, the term "regulation speed" refers to, for example, a speed that is predetermined by the related laws and regulations, or an upper limit speed in privately owned land or buildings (for example, a car park of a retail outlet) that is stipulated and displayed by the user thereof. These regulation speeds are examples of states of the external environment in which the vehicle 20 is traveling. The security ECU 100 can acquire state information indicating such a state from, for example, a data frame that indicates the result of recognition of an object (characters) in the surrounding environment that is provided by the sensor ECU 320. In addition, the security ECU 100 may acquire and utilize map information which is held by a car navigation system or automatic driving system that the vehicle 20 includes, or map information that a service that is outside the vehicle 20 provides, or information showing a regulation speed that is extracted from traffic information. The extraction of such information may be performed on the transmitting side or by the security ECU 100.

[1.7.2 Inconsistency in Distance to Object in Direction of Travel]

This inconsistency will be described using a preceding vehicle as an object that is in the direction of travel, and using a following distance as an example of a distance to the object. For example, in a case where the state that the state information indicates shows the following distance between the vehicle 20 and a preceding vehicle, and the acceleration control instruction indicates control that causes the vehicle 20 to travel at a speed that exceeds a first predetermined value, the determining unit 3101 determines that the acceleration control instruction is inconsistent with the state that the state information indicates and is thus a false control instruction.

Figure 7:
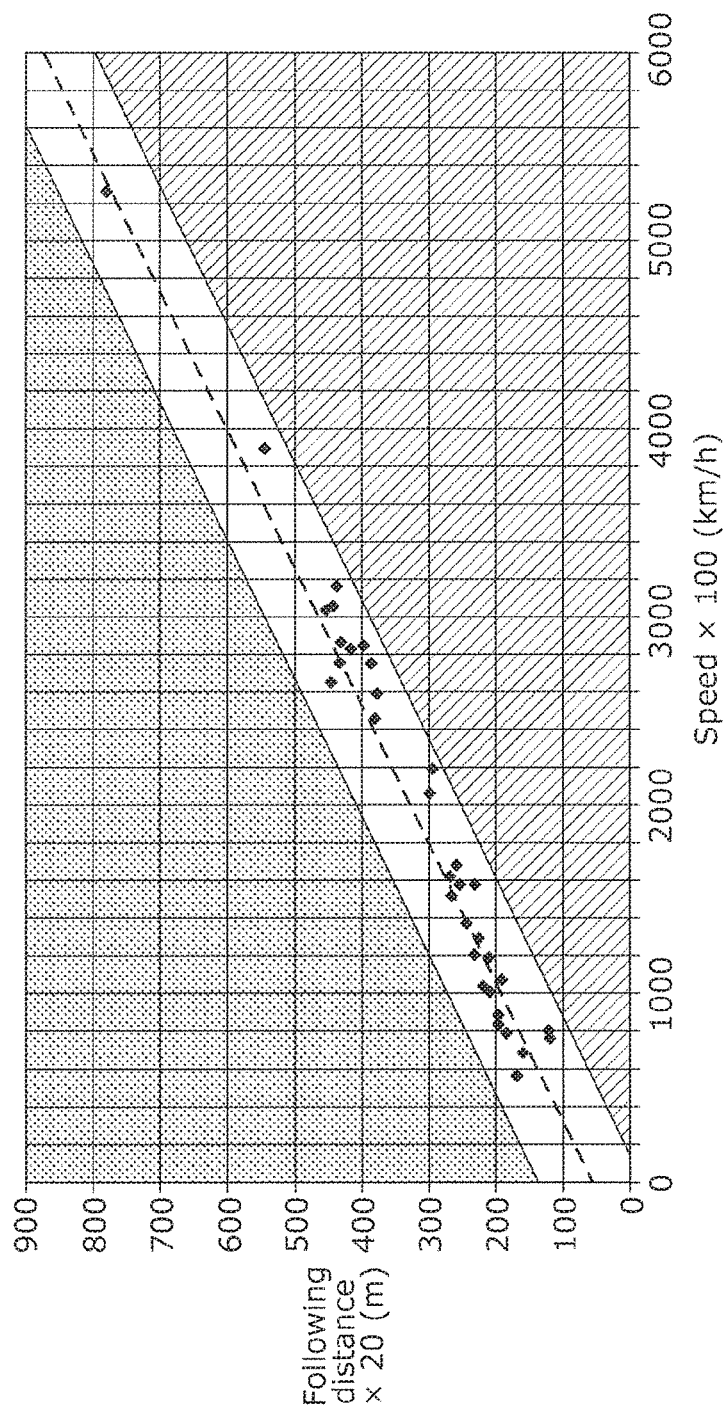
FIG. 7 is a view for describing a condition for determining whether an acceleration control instruction is false, which is defined based on the relation between a vehicle speed according to control by a speed control assistance function and a following distance.

The term "first predetermined value" as used here refers to, for example, a value of the absolute speed of the vehicle 20 that is determined in advance with respect to a following distance with respect to a preceding vehicle, and for example may be defined based on the relation with a following distance that is considered to be necessary for safety based on the stopping distance with respect to the speed. Furthermore, in this case the first predetermined value may be a value of a speed that is defined based on a relation between a vehicle speed that is set by control by the speed control assistance ECU 350 and the following distance. FIG. 7 is a view for describing conditions for a false determination with respect to an acceleration control instruction defined in this way. In FIG. 7, black points are plotted in a graph area based on the absolute speed of a vehicle according to acceleration control assistance performed by a speed control assistance function in a state in which the vehicle is not subjected to a cyber-attack of any kind (that is, a normal state), and the following distance with respect to the preceding vehicle at that time. That is, these points represent a case where the state in regard to the relation between the preceding vehicle and the following distance, and the control indicated by an acceleration control assistance instruction are consistent with each other. Accordingly, the contents of acceleration control which is such that the vehicle is caused to reach a speed which enters a region that is within a fixed distance range from a line (dashed line in FIG. 7) approximate to these points can be considered to be consistent with the state, and the contents of acceleration control which is such that the vehicle reaches a speed which enters a region that is outside the aforementioned region can be considered to be inconsistent with the state. In FIG. 7, a region having the shape of a right-angled triangle that is hatched with diagonal lines that is in the right lower part of the graph area represents a region in which the speed becomes excessive relative to the following distance and which is a region in which acceleration control assistance is not executed in a normal state, and is thus a region in which acceleration control assistance that is inconsistent with the state is plotted. The first predetermined value is a value of the abscissa axis representing the vehicle speed with respect to a value of the axis of ordinates that is based on the following distance that is on the hypotenuse of the aforementioned right-angled triangle. Furthermore, the first predetermined value may be a relative speed of the vehicle 20 with respect to the preceding vehicle. For example, the first predetermined value is the value of a relative speed that is determined beforehand in accordance with respective values for the following distance. The relation between the following distance and the relative speed with respect to the preceding vehicle, of a vehicle according to acceleration control assistance instruction performed by a speed control assistance function in a normal state that is exemplified above with regard to the absolute speed may be utilized as a technique for making this determination. Further, as a different example, the first predetermined value may be a value of the relative speed such that the following distance becomes less than the aforementioned following distance that is considered to be necessary for safety within a predetermined time period (for example, 0.5 seconds).

Note that, the following distance with respect to the preceding vehicle can be considered as both a circumstance of the vehicle 20 and a state of the external environment in which the vehicle 20 is traveling. The security ECU 100 can acquire state information indicating this circumstance from, for example, a data frame indicating a result of object recognition and a measurement result obtained by a distance sensor which is transmitted from the sensor ECU 320. Further, the vehicle speed is a circumstance of the vehicle 20, and the security ECU 100 can acquire state information indicating this circumstance from, for example, a data frame indicating a measurement result obtained by a speed sensor which is transmitted from the sensor ECU 320. Furthermore, the relative speed may be calculated by the determining unit 3101 based on a data frame indicating the speed of the vehicle 21 that the communication ECU 380 received from the vehicle 21.

Note that, as described above, a preceding vehicle is an example of an object that is in the direction of travel, and the following distance is an example of a distance with respect to an object. An object that is in the direction of travel is not limited to a movable body such as a vehicle, and can be various kinds of objects which it is not intended to come in contact with while traveling.

[1.7.3 Inconsistency Relating to Deceleration Control]

For example, in a case where an acceleration control instruction for causing the vehicle 20 to accelerate is acquired, and the state that the state information indicates is a state in which the vehicle 20 should be caused to decelerate, the determining unit 3101 determines that the acceleration control instruction is inconsistent with the state that the state information indicates and is thus a false control instruction.

As used here, the phrase "state in which the vehicle 20 should be caused to decelerate" refers to, simply speaking, a state in which brake control is being executed by means of an operation of the driver in the vehicle 20, although the meaning of the phrase is not limited thereto. As another example, a state in which a brake control instruction with respect to the vehicle 20 is issued by any of the functions provided by the advanced driver assistance system may be mentioned. Note that, in this case the term "brake control" is not limited to braking by means of the frictional force of brake pads. The term "brake control" also includes engine braking or exhaust braking by active shifting to lower gears. Further, in the case of a vehicle in which the prime mover is a motor and in which regenerative braking is actively utilized for deceleration, the term "brake control" also includes control of regenerative braking. Further, a state in which the vehicle 20 should be caused to decelerate also includes a state in which brake control should be performed by a driver or the advanced driver assistance system, more specifically, for example, when a preceding vehicle decelerates or performs brake control, when an object or a person such as a vehicle that is stopped, a building or a passerby is detected within a range that is less than a predetermined distance in the direction of travel of the vehicle 20, and when the vehicle 20 approaches a curve or approaches an area in which the regulation speed is lower than the current vehicle speed.

The aforementioned state in which brake control is performed by the driver or the advanced driver assistance system is a state of the vehicle 20, and the security ECU 100 can acquire a data frame indicating the state with respect to application of the brakes that is transmitted from the brake ECU 330 or an ECU that is responsible for the function of the advanced driver assistance system. Detection of the occurrence of deceleration or brake control in a preceding vehicle, detection of a person or object in the direction of travel, approach of the vehicle 20 to a curve, and approach of the vehicle 20 to an area in which the regulation speed is lower than the current vehicle speed are states of the external environment in which the vehicle 20 is traveling, and the security ECU 100 can acquire state information indicating these states from, for example, a data frame that indicates the result of object recognition or the like that is transmitted from the sensor ECU 320. Further, state information regarding the occurrence of deceleration or brake control in a preceding vehicle may also be acquired from a data frame that the communication ECU 380 receives from the vehicle 21. Furthermore, the security ECU 100 may also acquire state information indicating that the vehicle 20 is approaching a curve or is approaching an area in which the regulation speed is lower than the current vehicle speed from a data frame that includes map information which is held by a car navigation system provided in the vehicle 20, or map information that a service which is outside the vehicle 20 provides, or information showing a regulation speed that is extracted from traffic information.

[1.7.4 Inconsistency with Vehicle Speed Determined Based on Information from Outside]

For example, in a case where the state that the state information indicates is that information indicating a speed at which the vehicle 20 should travel was received from a vehicle preceding the vehicle 20, and an acceleration control instruction indicates control that causes the vehicle 20 to travel at a speed that exceeds the speed that the received information indicates, the determining unit 3101 determines that the acceleration control instruction is inconsistent with the state that the state information indicates and is a false control instruction.

In the case of vehicles which are capable of vehicle-to-vehicle communication, a situation can be supposed in which, when a following distance maintenance function or a following distance adjustment function is executed, information that directly or indirectly indicates a speed at which a following vehicle should travel at is transmitted from a preceding vehicle to the following vehicle. More specifically, for example, information including a suggestion regarding an absolute speed at which the following vehicle should travel or a relative speed with respect to the preceding vehicle at which the following vehicle should travel can be transmitted. Such kinds of information are examples of information that directly indicates a speed at which the vehicle 20 that is the following vehicle should travel. In contrast, information that indirectly indicates a speed at which the vehicle 20 as the following vehicle should travel is information transmitted from the preceding vehicle that can be used to decide the vehicle speed of the vehicle 20. Specifically, such kinds of information include an instruction to accelerate or decelerate, an instruction to execute brake control, information indicating the speed of the relevant preceding vehicle, whether or not braking is being performed by the preceding vehicle as well as the strength of such braking, the current following distance, or an instruction regarding a following distance that should be realized. The security ECU 100 receives a data frame that is transmitted to the bus 30 by the communication ECU 380 and includes state information indicating the state of the vehicle 20 in which such kind of information has been received and the contents of the information. In the security ECU 100, based on the contents of the information obtained from the data frame, the determining unit 3101, for example, determines whether the vehicle 20 should accelerate from, decelerate from, or maintain the current vehicle speed, and in a case where the vehicle 20 should accelerate or decelerate, the determining unit 3101 determines the amount by which the vehicle 20 should accelerate or decelerate, that is, the speed control. Then, based on the determined result and the result of a comparison with the control of the acceleration control instruction transmitted from the speed control assistance ECU 350, the determining unit 3101 determines whether or not the acceleration control instruction is inconsistent with the state that the state information indicates.

[1.7.5 Inconsistency with Operating State of Advanced Driver Assistance System]

In a case where, for example, the state that the state information indicates is that an advanced driver assistance system provided in the vehicle 20 is turned off, and an acceleration control instruction indicates control that causes the vehicle 20 to travel at a speed that exceeds a third predetermined value, or the reception unit 1101 acquired the acceleration control instruction within a predetermined time period, the determining unit 3101 determines that the relevant acceleration control instruction is inconsistent with the state that the state information indicates and is a false control instruction.

When the advanced driver assistance system is turned off, an acceleration control instruction for causing the vehicle 20 to accelerate by more than a certain amount is not transmitted from the speed control assistance ECU 350. The third predetermined value is a value that the determining unit 3101 uses as a reference for detecting such kind of acceleration control instruction that is inconsistent with the state of the vehicle 20 in which the advanced driver assistance system is turned off. Further, there is a time period that is the minimum time taken for an acceleration control instruction to be transmitted from the speed control assistance ECU 350 upon the advanced driver assistance system being switched from an "off" state to an "on" state. The predetermined time period is a value that the determining unit 3101 uses as a reference for detecting such kind of acceleration control instruction that is inconsistent with the state of the vehicle 20 in which the advanced driver assistance system is turned off.

In the case of this example, the security ECU 100 acquires the state of the vehicle 20 which are that the advanced driver assistance system is turned off, from a data frame that, for example, is transmitted from an ECU relating to the advanced driver assistance system. The speed control assistance ECU 350 is an example of an ECU relating to the advanced driver assistance system.

[1.8 Control Processing of Security ECU 100]

Figure 8:
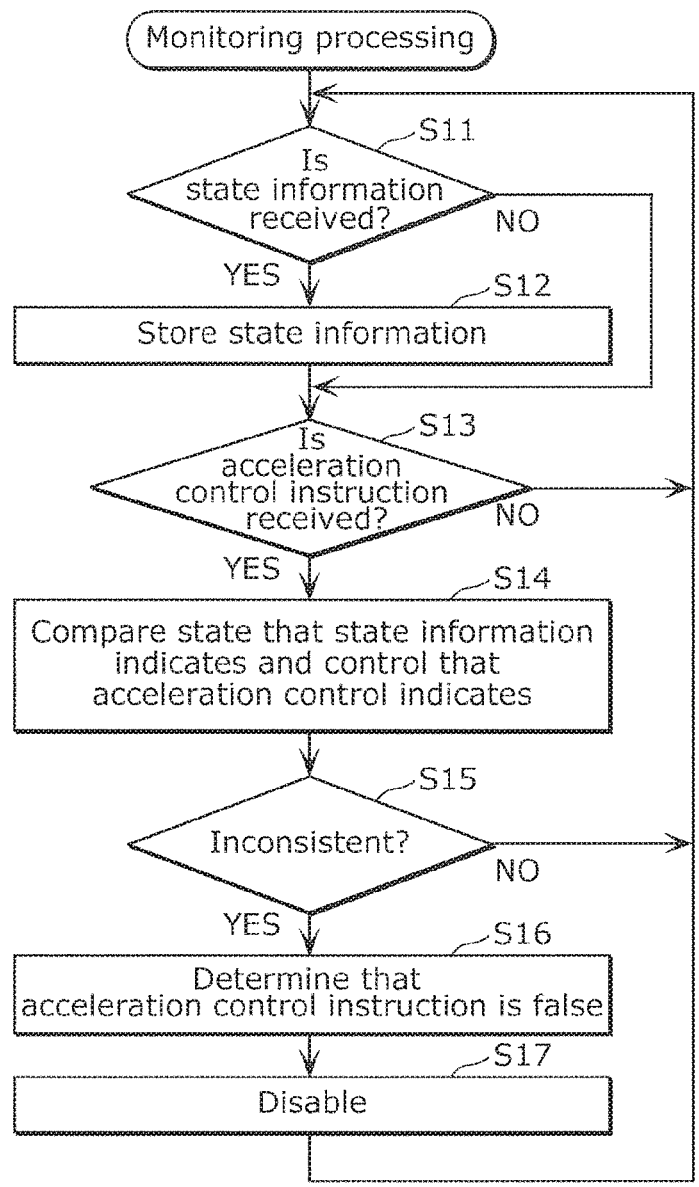
FIG. 8 is a flowchart illustrating an example of procedures of monitoring processing executed by a security ECU according to Embodiment 1.

FIG. 8 is a flowchart illustrating an example of the procedures of monitoring processing executed at the security ECU 100 in the in-vehicle network system 10. Hereunder, monitoring processing that is executed at the security ECU 100 as processing to deal with an attack frame of a false acceleration control instruction will be described with reference to the procedures in FIG. 8.

In a case where the reception unit 1101 receives a data frame including state information from the bus 30 (Yes in step S11), the received state information is stored in the storage unit 2100 (step S12). Data frames including state information are periodically transmitted from the sensor ECU 320, and the reception and storage of state information in step S12 is repeatedly performed.

In a case where the reception unit 1101 receives a data frame of an acceleration control instruction from the bus 30 (Yes in step S13), the determining unit 3101 compares the state indicated by the most recent state information stored in the storage unit 2100 and the control that the received acceleration control instruction indicates (step S14). Based on this comparison, the determining unit 3101 determines whether or not the state and the control are inconsistent with each other (step S15), and if the state and the control are inconsistent with each other (Yes in step S15), the determining unit 3101 determines that the acceleration control instruction relating to the data frame received in step S13 is false. Note that, if reception up to the data field of the data frame of the acceleration control instruction is completed by the reception unit 1101, the control that the acceleration control instruction indicates can be acquired, and hence the determining unit 3101 can execute the steps from step S14 onward.

The disabling unit 3102 disables the data frame of an acceleration control instruction that is determined as false in step S16, by causing the transmission unit 1102 to transmit an error frame (step S17).

[1.9 Processing Sequence Relating to Acceleration Control in in-Vehicle Network System 10]

Figure 9:
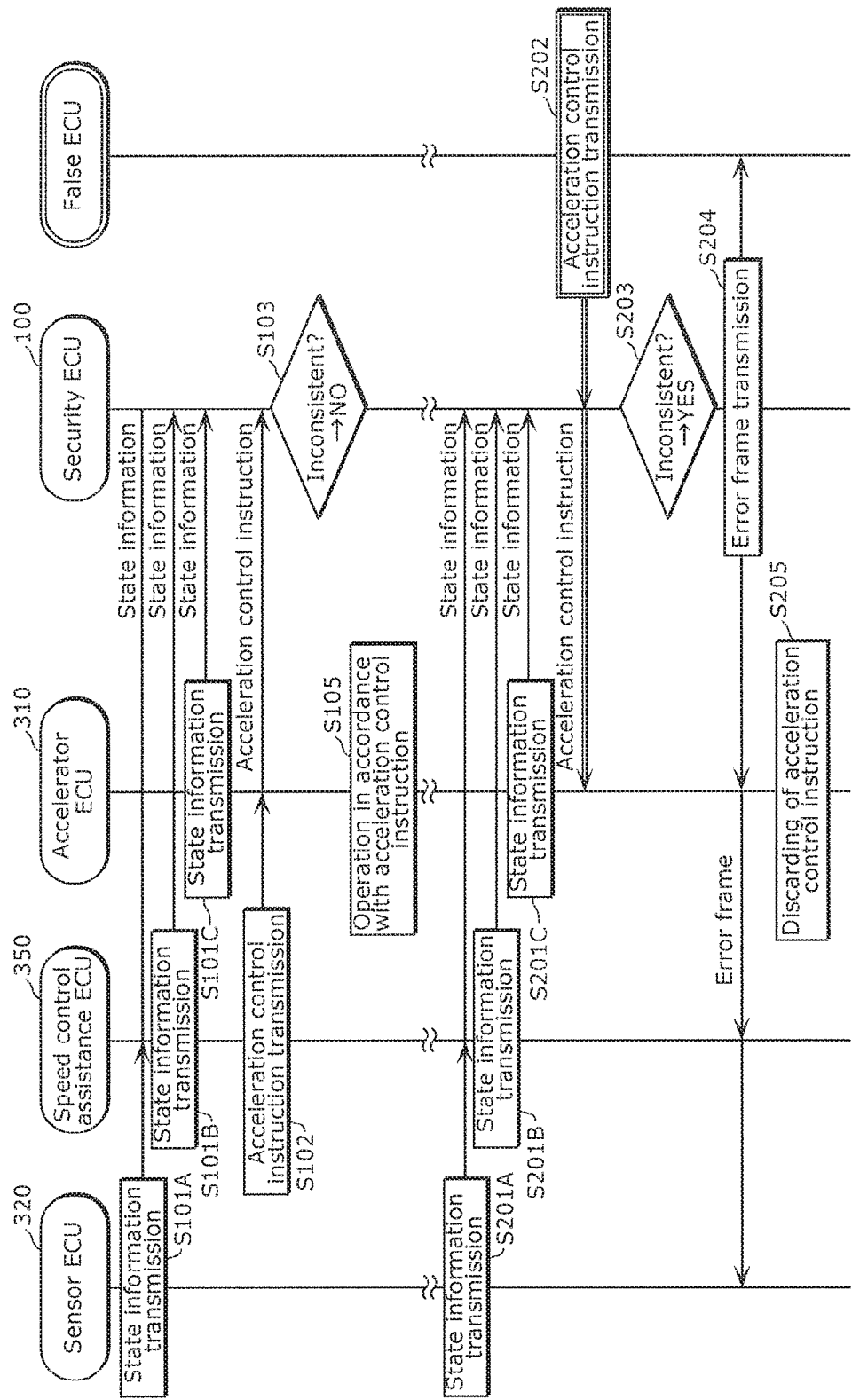
FIG. 9 is a view illustrating an example of a processing sequence relating to acceleration control in Embodiment 1.

FIG. 9 illustrates an example of a processing sequence relating to acceleration control in the in-vehicle network system 10. Hereunder, the operations of the respective ECUs in the in-vehicle network system 10 will be described with reference to FIG. 9. Note that, the term "false ECU" as used herein refers to any ECU in the in-vehicle network system 10 (including ECUs that are not shown in the drawings) that is, for example, an ECU which is connected to the diagnostic port 390 by an attacker or is an ECU which is hijacked by an attacker by overwriting firmware thereof or the like. Further, for convenience in illustrating a contrast between the different kinds of processing to be executed, the first half (upper half) of the processing sequence is an example of a case where a false data frame is not transmitted, and the second half (lower half) of the processing sequence is an example of a case where a false data frame is transmitted.

The sensor ECU 320 transmits a data frame that includes state information showing a measurement result that was measured by the object detection sensor 321 or the speed sensor 322 to the bus 30 (step S101A). The speed control assistance ECU 350 and the security ECU 100 receive the data frame from the bus 30. Further, the speed control assistance ECU 350 transmits a data frame including information indicating whether various acceleration assistance functions are enabled or disabled to the bus 30 (step S101B). The security ECU 100 receives the aforementioned data frame from the bus 30. The accelerator ECU 310 transmits a data frame showing the current accelerator opening degree to the bus 30 (step S101C). The security ECU 100 receives the aforementioned data frame from the bus 30. In this way, the security ECU 100 acquires state information showing the state of the vehicle 20 and the state of the external environment in which the vehicle 20 is traveling.

Based on the state information transmitted by the sensor ECU 320 in step S101A, the speed control assistance ECU 350 transmits an acceleration control instruction for an enabled acceleration assistance function, for example, a data frame indicating an accelerator opening degree for maintaining the vehicle speed as control to the bus 30 (step S102). The accelerator ECU 310 and the security ECU 100 receive the aforementioned data frame from the bus 30.

The security ECU 100 that receives the aforementioned data frame and thereby acquires the acceleration control instruction determines whether the control that the acceleration control instruction indicates is inconsistent with the state indicated by the state information that was transmitted in steps S101A to 101C (step S103). In this example, since the control is not inconsistent with the state indicated by the state information, the security ECU 100 does not execute disabling processing with respect to the data frame transmitted in step S102. The accelerator ECU 310 operates in accordance with the acquired acceleration control instruction (step S105).

Next, in a similar manner to steps S101A to S101C, the sensor ECU 320, the speed control assistance ECU 350, and the accelerator ECU 310 each transmit a data frame showing newer state information to the bus 30 (step S201A, S201B, S201C). The security ECU 100 acquires these items of newer state information.

A false ECU then transmits a false data frame that contains an acceleration control instruction for the purpose of an attack (step S202). The accelerator ECU 310 and the security ECU 100 receive the false data frame from the bus 30.

The security ECU 100 that receives the aforementioned data frame and thereby acquires the acceleration control instruction determines whether the control that the acceleration control instruction indicates is inconsistent with the state indicated by the state information that was transmitted in steps S201A to 201C (step S203). In this example, because the control is inconsistent with the state indicated by the state information, as disabling processing with respect to the data frame that was transmitted in step S202, the security ECU 100 transmits an error frame to the bus 30 while the relevant data frame appears on the bus 30. The accelerator ECU 310 that received the error frame discards the data frame that was transmitted in step S202 which the accelerator ECU 310 was in the process of acquiring (step S205).

The foregoing is a description that uses an example of a processing sequence relating to acceleration control in the in-vehicle network system 10. However, a processing sequence relating to acceleration control in the in-vehicle network system that includes the security ECU 100 according to the present embodiment is not limited to the foregoing example. For example, the security ECU 100 need not always use the latest state information of all kinds for determining whether there is an inconsistency. Further, a determination as to whether there is an inconsistency may be executed a plurality of times using the same state information. For example, in the foregoing example, although a description was omitted for the purpose of simplicity, the data frame of an acceleration control instruction may be transmitted from the speed control assistance ECU 350 also after step S201, and the security ECU 100 may acquire an acceleration control instruction from this data frame and make a determination as to whether there is an inconsistency. According to the CAN protocol, the data frame of a control instruction with respect to the same control object is periodically transmitted, and in some cases a false data frame for the purpose of an attack is transmitted at a time that is very close to an authentic data frame so as not to be rejected in accordance with the period rules. With respect to such kind of attack also, a false data frame which is determined as indicating control that is inconsistent with the state based on the result of comparing the state that the state information indicates and the contents of the control instruction is appropriately disabled.

[1.10 Advantageous Effects of Embodiment]

In the in-vehicle network system 10 according to the present embodiment, immediately before reception of an acceleration control instruction (that is, a data frame acceleration control instruction) is completed by the reception unit 1101, on the basis of state information that is acquired from another device such as the sensor ECU 320, the monitoring processing unit 3100 of the security ECU (monitoring device) 100 determines by a predetermined method whether the control of the relevant acceleration control instruction is inconsistent with the state that the state information indicates. If the control is inconsistent, the security ECU 100 performs disabling processing that disables the relevant acceleration control instruction by transmission of an error frame. With respect to the predetermined method, various combinations of a state and control can be defined in advance to serve as a reference for determining an inconsistency. Since a false data frame that includes acceleration control that is inconsistent with the state are disabled on the bus 30 by transmission of an error frame from the security ECU 100, it is possible to prevent the occurrence of a situation in which the accelerator ECU 310 completes reception of the false data frame and controls the prime mover 311 in accordance with an acceleration control instruction that the data frame in question contains. That is, in the in-vehicle network system 10, an appropriate countermeasure to deal with a false frame (attack frame) relating to an acceleration control instruction is executed by the security ECU 100, and it is possible to prevent an accident that could be caused by the attack frame.

(Variations of Embodiment 1)

As described above, Embodiment 1 has been described as an illustrative example of the technology according to the present invention. However, the technology according to the present invention is not limited to the above embodiment, and is also applicable to embodiments in which modifications, replacements, additions, omissions, and the like are made as appropriate. For example, the following variations are also included in embodiments of the present invention.

Figure 10:
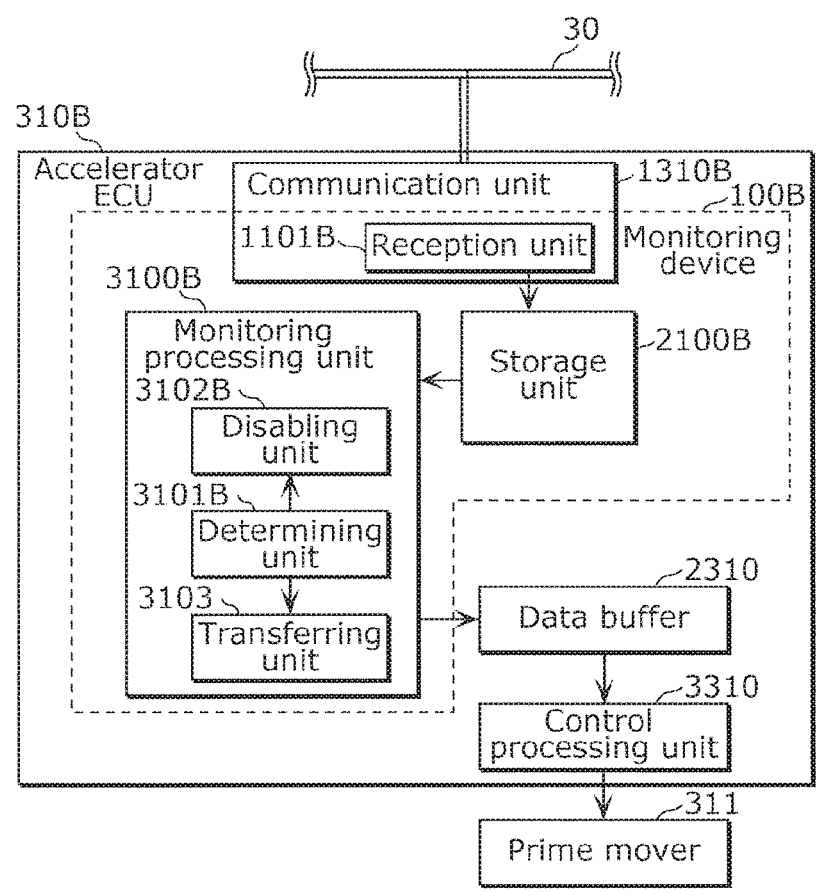
FIG. 10 is a block diagram illustrating an example of the configuration of an accelerator ECU according to one variation of Embodiment 1.

(1) In Embodiment 1 described above, a monitoring device that is implemented by the security ECU 100 that performs a function for securing the security of the in-vehicle network system 10 may be implemented as one part of the accelerator ECU 310. In this case, discarding of a data frame that contains a false acceleration control instruction may be executed as disabling processing by the disabling unit 3102. FIG. 10 is a block diagram illustrating a configuration example in which an accelerator ECU includes a monitoring device as one part thereof.

In addition to the constituent elements of the accelerator ECU 310 in Embodiment 1, an accelerator ECU 310B according to the present variation also includes a storage unit 2100B and a monitoring processing unit 3100B. Further, a communication unit 1310B of the accelerator ECU 310B performs the functions of both the communication unit 1310 and the communication unit 1100 which the security ECU 100 includes in Embodiment 1. Among these functions, a portion that corresponds to the reception unit 1101 of the communication unit 1100 is described as a reception unit 1101E in the description of the accelerator ECU 310B. According to the present variation, the storage unit 2100B, the monitoring processing unit 3100B, and the reception unit 1101E constitute a monitoring device 100B inside the accelerator ECU 310B. Hereunder, the differences between the monitoring device 100B and the security ECU 100 that is the monitoring device in Embodiment 1 are mainly described.

As mentioned above, the reception unit 11018 corresponds to the reception unit 1101 of the communication unit 1100 of the security ECU 100 in Embodiment 1. The storage unit 2100B corresponds to the storage unit 2100 of the security ECU 100. In addition to a determining unit 3101B that corresponds to the determining unit 3101, and a disabling unit 3102B that corresponds to the disabling unit 3102 of the monitoring processing unit 3100 of the security ECU 100, the monitoring processing unit 3100B includes a transferring unit 3103.

In addition to data frames that the accelerator ECU 310 receives, the reception unit 1101B also receives data frames including state information from other ECUs. Note that, in the present variation, the state information which the security ECU 100 receives from the accelerator ECU 310 in Embodiment 1 is acquired by the monitoring processing unit 3100B inside the accelerator ECU 310B.

Figure 11:
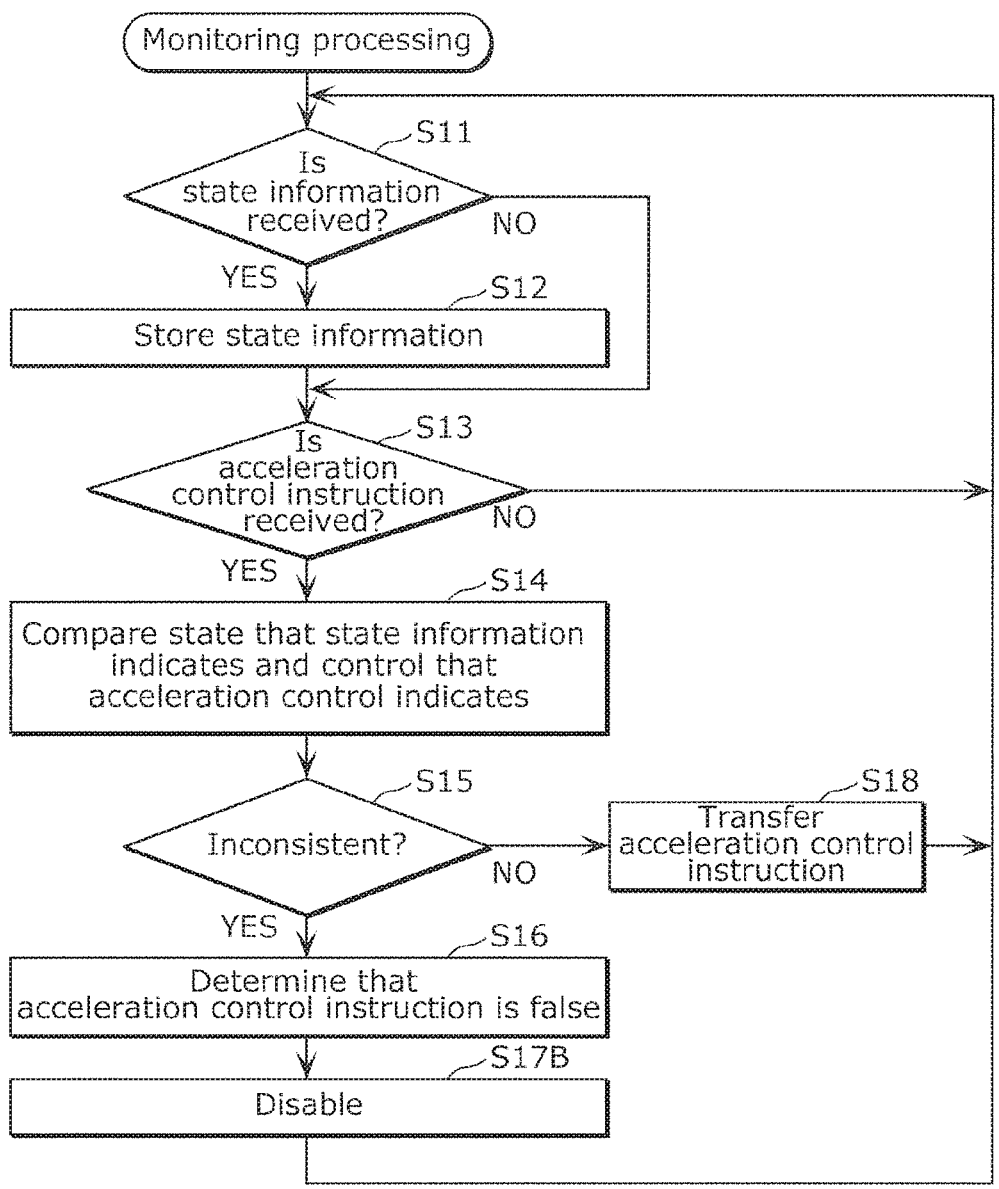
FIG. 11 is a flowchart illustrating an example of procedures of monitoring processing executed by a monitoring device according to the aforementioned variation.

In the monitoring processing unit 3100B, similarly to the determining unit 3101, the determining unit 3101B makes a determination (step S15 in FIG. 8) by comparing the state that the state information indicates and the control that is indicated by the acceleration control instruction from the speed control assistance ECU 350, and outputs the result of the determination. However, the processing in a case where it is determined that the state and the control are not inconsistent with each other differs from the processing performed in such a case by the determining unit 3101. FIG. 11 is a flowchart illustrating an example of procedures of monitoring processing that includes this difference, which is executed by the monitoring device 100B of the accelerator ECU 310B. In this case (No in step S15), the determining unit 3101B which determined that the acceleration control instruction is not false notifies that result to the transferring unit 3103. Upon receiving the notification, the transferring unit 3103 stores the contents (ID, data in the data field, and the like) of the data frame relating to the relevant acceleration control instruction in the data buffer 2310 (step S18).

In the monitoring processing unit 3100B, in a case where it is determined that the state and the control are inconsistent with each other and the acceleration control is thus false (Yes in step S15; step S16), the disabling unit 3102B discards the data frame relating to the acceleration control instruction in question (step S17B).

Figure 12:
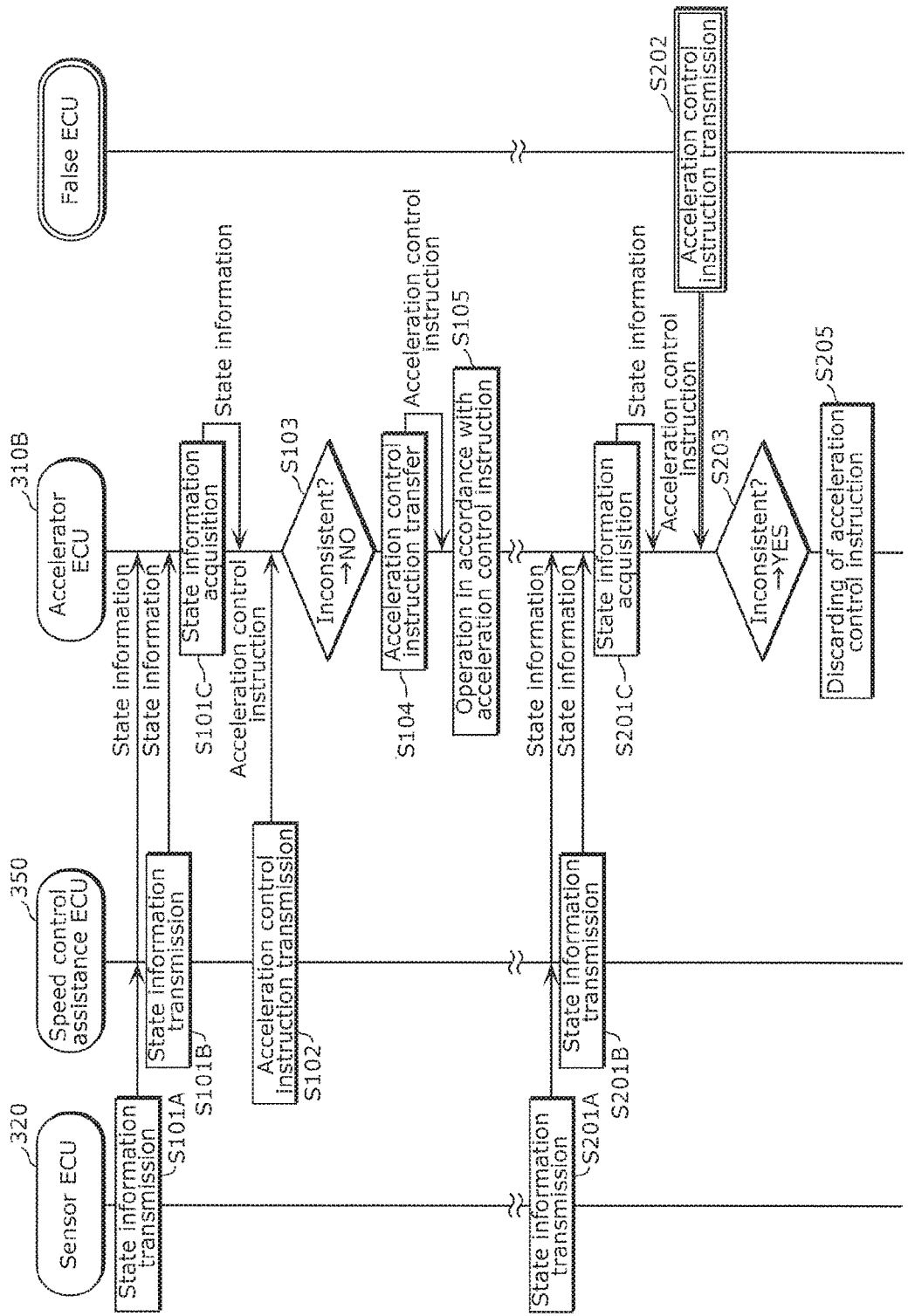
FIG. 12 is a view illustrating an example of a processing sequence relating to acceleration control in the aforementioned variation.

FIG. 12 illustrates an example of a processing sequence relating to acceleration control in the in-vehicle network system 10 that includes the accelerator ECU 310B. The processing sequence illustrated in FIG. 12 differs from the processing sequence of Embodiment 1 illustrated in FIG. 9 in the respect that the accelerator ECU 310B acquires each item of state information, the accelerator ECU 310B makes a determination regarding an inconsistency (steps S103 and S203), and the accelerator ECU 310B executes an operation to transfer the acceleration control instruction in a case where the state and the control are not inconsistent with each other (step S104).

Note that, in addition, similarly to the disabling unit 3102, the disabling unit 3102B may cause the communication unit 1310B to transmit an error frame to the bus 30.

(2) The state of the vehicle that the state information indicates or the state of the external environment in which the vehicle is traveling that is to be compared with the control of an acceleration control instruction by the determining units 3101 and 3101B is not limited to the state described above in Embodiment 1. For example, contents indicating road traffic signs or road markings at a place that the vehicle is traveling through or a planned travel route of the vehicle may also be included in the state of the external environment that the state information indicates. For example, it may be determined whether or not the control of an acceleration control instruction is inconsistent with circumstance of a regulation relating to speed that are shown by a road traffic sign. Further, for example, a state that can influence a safe speed such as the weather, air temperature, state of the road surface, topography (gradient ratio), a movable load or a balance thereof, a state regarding changes in the vehicle speed, or the type of tires or the degree of deterioration of the tires, or the like may also be included in the state of the vehicle or the external environment that the state information indicates. Such information can be acquired from, for example, a sensor mounted in the vehicle, map data, a system that provides road traffic information such as VICS (registered trademark), or a service provided on the Internet. The determining unit 3101 or 3101B may make a determination regarding an inconsistency using as a reference, in addition to the traveling speed of the vehicle, whether or not acceleration in accordance with the accelerator opening degree that the acceleration control instruction indicates can be safely executed with respect to these states. For example, a reference that differs depending on these states that the state information indicates may be used, or a discriminant function or a discriminant model that adopts these items of state information as input values may be used.

(3) References that differ for each type of vehicle with respect to the vehicle 20 may be used as references for determining whether or not an acceleration control instruction is inconsistent with respect to the state described in Embodiment 1 and variations thereof that are described above. Here, the term "type of vehicle" may refer to a type that is identified according to the vehicle model, or may refer to a more detailed grading. Further, the type of vehicle may be further distinguished according to the presence or absence of a predetermined function realized by an option or the like.

Further, the contents of information that are transmitted from the speed control assistance ECU 350 from among the state information to be compared with the control are not limited to the contents described above. For example, the contents of settings relating to acceleration control by the driver may be included. For example, the following distance with respect to the preceding vehicle that the driver sets with respect to a following distance maintenance function or a following distance adjustment function may be included.

(4) The division of functions among the various constituent elements in the in-vehicle network system 10 described in the foregoing embodiment or variations thereof or in a control network system that includes the in-vehicle network system 10 is one example, and the division of functions described above can be changed. Further, some of the functions of the monitoring processing unit 3100 and the like in the security ECU 100 or the monitoring processing unit 3100B in the accelerator ECU 310B may be performed by a device that can communicate with the security ECU 100, for example, another ECU in the in-vehicle network system 10, or an external server apparatus of the in-vehicle network system 10 or the like. For example, in the embodiment described above, another security ECU that is different from the security ECU 100 may be included in the in-vehicle network system 10, and among the functions of the monitoring processing unit 3100, the function of the disabling unit 3102 may be performed by the other security ECU. In this case, the result of a determination that is output from the determining unit 3101 may be transmitted to the bus 30 from the transmission unit 1102 as a data frame, or may be transmitted to another security ECU using a dedicated line.

(5) One form of the present invention may be a monitoring method that includes, for example, all or some of the processing procedures described in FIG. 8 and FIG. 9, FIG. 11 and FIG. 12, and also the descriptions relating to these drawings in the present specification. For example, the monitoring method includes: an acquisition step (for example, steps S11 and S13) of acquiring state information indicating at least one of a state of the vehicle 20 and a state of the external environment in which the vehicle 20 is traveling, and also an acceleration control instruction that is transmitted to the in-vehicle network system 10; a determination step (for example, step S14) of determining whether or not the acceleration control instruction is a false control instruction by comparing the state that the acquired state information indicates with the control indicated by the acquired acceleration control instruction; and an output step (for example, step S15) of outputting information that shows the result of the determination performed in the determination step. Further, the monitoring method may also include a disabling step (for example, step S17 or S17B) of disabling the acceleration control instruction in a case where it is determined by the determination step that the acceleration control instruction is a false control instruction. This kind of method is executed, for example, by an ECU that functions as a monitoring device that monitors acceleration control instructions for accelerating the vehicle 20 that are transmitted in the in-vehicle network system 10.

Further, as one form of the present invention, the processing relating to the monitoring method may be a computer program that a computer is caused to execute, or may be a digital signal composed of the computer program. The processing relating to the monitoring method is processing that includes: an acquisition step (for example, steps S11 and S13) of acquiring state information indicating at least one of a state of the vehicle 20 and a state of the external environment in which the vehicle 20 is traveling, and also an acceleration control instruction that is transmitted to the in-vehicle network system 10; a determination step (for example, step S14) of determining whether or not the acceleration control instruction is a false control instruction by comparing the state that the acquired state information indicates with the control indicated by the acquired acceleration control instruction; and an output step (for example, step S15) of outputting information that shows the result of the determination performed in the determination step. The information that is output may be used as an input to another program module or computer program, or to another device that is capable of communication. For example, disabling of a data frame, disabling of a speed control assistance ECU, automatic driving for emergency stopping, presentation to the driver of a notification relating to the occurrence of an attack, or recording of an error log or the like may be executed by the aforementioned other program module or the like.

(6) Processing for disabling in the above described embodiment and the variations thereof is not limited to processing that disables by sending an error frame to a CAN bus. Discarding of a data frame that is executed by the accelerator ECU 310B that is described above is also one form of disabling processing. As another example, not transferring a data frame containing a false acceleration control instruction by a monitoring device that is implemented as a part of a gateway in a network is also included as one form of disabling processing.

Embodiment 2

Hereunder, as one embodiment of the present invention, an in-vehicle network system having a security ECU (monitoring device) that disables a frame relating to a false steering control instruction that is transmitted to a bus (CAN bus) constituting part of an in-vehicle network in a vehicle as one example of a movable body is described using the accompanying drawings. Note that, constituent elements that are common with constituent elements of the in-vehicle network system in Embodiment 1 are denoted by the same reference characters as in Embodiment 1.

[2.1 Configuration of In-vehicle Network System 10A]

Figure 13:
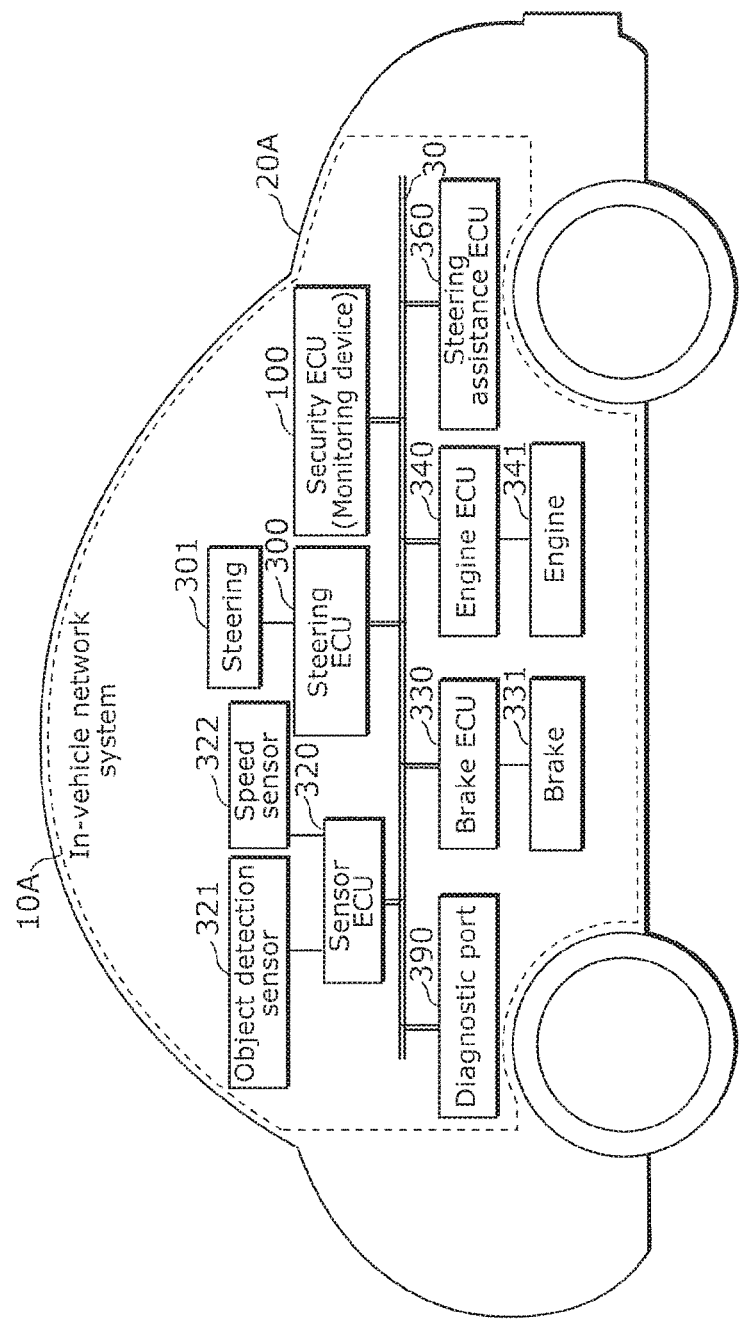
FIG. 13 is a diagram illustrating the overall configuration of an in-vehicle network system according to Embodiment 2.

FIG. 13 is a diagram illustrating the overall configuration of an in-vehicle network system 10A according to the present embodiment.

As illustrated in FIG. 13, the in-vehicle network system 10A is configured to include various ECUs (a security ECU 100A, a steering ECU 300, a sensor ECU 320, a brake ECU 330, an engine ECU 340, and a steering assistance ECU 360) and a bus (CAN bus) 30 that are mounted in a vehicle 20A. The bus 30 is illustrated by means of a double line. Note that, other ECUs apart from the aforementioned ECUs can also be included in the in-vehicle network system 10A, although such ECUs are not illustrated in FIG. 13. Further, the in-vehicle network system 10A may constitute a control network system for the vehicle 20A together with a server apparatus or the like which is outside the vehicle and with which any of the ECUs, including ECUs which are not illustrated in FIG. 13, communicates. Note that, it is possible that a communication path with the outside may be utilized for a cyber-attack on the in-vehicle network system 10A as an infiltration path for introducing (transmitting) a false frame into the in-vehicle network system 10A or for hijacking one of the ECUs.

Each ECU in the in-vehicle network system 10A is a device including, for example, a processor (microprocessor), digital circuits such as a memory, analog circuits, a communication circuit, and so forth. The memory is a ROM (Read-Only Memory), a RAM (Random Access Memory), or the like, and is capable of storing a control program (computer program as software) that is executed by the processor. For example, the processor operates in accordance with the control program (computer program), thereby allowing the ECU to implement various functions. The computer program is constituted by combining a plurality of instruction codes indicating instructions for the processor to achieve a predetermined function. These ECUs are capable of transmitting and receiving frames through the bus 30 in accordance with the CAN protocol.

Some of the ECUs in the in-vehicle network system 10A are connected to various devices such as a sensor, an actuator, or a user interface device by a communication path other than the bus 30. For example, the steering ECU 300 is connected to (an actuator of) steering 301, and controls the steering 301. The brake ECU 330 is connected to (an actuator of) a brake 331, and controls the brake 331. Further, the engine ECU 340 is connected to (a throttle or the like of) an engine 341, and controls the engine 341. Note that, illustration of the individual actuators and the like that control the respective constituent elements described above is omitted from FIG. 13, and hereunder, to simplify the description, a control instruction with respect to the respective actuators is sometimes described as a control instruction with respect to the respective constituent elements. Further, the sensor ECU 320 is connected to an object detection sensor 321 and a speed sensor 322, and periodically transmits frames (data frames) representing measurement information measured by each sensor to the bus 30. Although a plurality of the sensor ECUs 320 may be provided in correspondence with the respective sensors in the in-vehicle network system 10A, for convenience in the description, an example is described in which there is a single sensor ECU 320 that can transmit frames that represent measurement information measured by each of the plurality of sensors. However, it is not necessary that all of the sensors in the in-vehicle network system 10A are connected to the sensor ECU 320, and there may be sensors that are connected to an ECU other than the sensor ECU 320, such as the steering ECU 300 or the engine ECU 340. The object detection sensor 321 detects detection objects such as a vehicle, an obstacle, a passerby, and lane markings on the road surface in the direction of travel of or the area around the vehicle 20A. The object detection sensor 321 also measures a distance between the vehicle 20A and the detection object and the like. More specifically, for example, the object detection sensor 321 can be implemented by a camera (image sensor) such as a camera that photographs the frontward direction, lateral directions, rearward direction or the entire surrounding area of the vehicle 20A, or by radar or LiDAR, or by a combination of these methods. The speed sensor 322 is a sensor for detecting the speed of the vehicle 20A. Although in this case the term "speed of the vehicle 20A" refers to, for example, the absolute speed of the vehicle 20A, it may refer to the relative speed of the vehicle 20A with respect to a detection object which the object detection sensor 321 detected. Note that, the absolute speed of the vehicle 20A is equal to the relative speed of the vehicle 20A with respect to a detection object which is not moving.

The steering assistance ECU 360 is an ECU that performs a steering assistance function of the advanced driver assistance system. In order to request the steering ECU 300 to perform steering control, the steering assistance ECU 360 periodically transmits a frame of a steering control instruction having control that is determined based on information acquired from other ECUs, such as measurement information acquired from the sensor ECU 320, to the bus 30. The steering assistance ECU 360, for example, transmits to the bus 30 a frame of a steering control instruction which has as the contents thereof a designation that requests steering of an amount that does not cause the vehicle to deviate from the traffic lane in which the vehicle is currently traveling. Note that, the steering assistance ECU 360 may be integrated with or directly connected to another ECU such as the sensor ECU 320, for example, and may acquire various kinds of information such as measurement information without receiving the information through the bus 30. Further, a direct connection between the steering assistance ECU 360 and another ECU may be performed through a dedicated line.

A diagnostic port 390 is a terminal that is connected to the bus 30, such as an OBD 2 (On-Board Diagnostics 2), and access to the bus 30 by a device such as a diagnostic tool (fault diagnosis tool) is possible through the diagnostic port 390. The diagnostic port 390 can also be utilized for an attack on the in-vehicle network system 10A.

The security ECU 100A performs a function for ensuring the security of the in-vehicle network system 10A. In the present embodiment, the security ECU 100A is a device that monitors frames that flow through the bus 30 and, by transmitting an error frame, disables a data frame relating to a false steering control instruction that appears on the bus 30, and thereby functions as a monitoring device that deals with attack frames of false steering control instructions. Note that the security ECU 100A may have a function that determines whether or not a data frame on the bus 30, and not just a frame of a false steering control instruction, is false using another certain condition, and disables a false data frame.

[2.2 Data Frame Format]

In the present embodiment also, a case in which data frames (messages) that are used on a network in accordance with the CAN protocol are exchanged on the bus 30 is utilized as an example to describe the present invention. The data frames are the same as the data frames described above in Embodiment 1 with reference to FIG. 2.

[2.3 Error Frame Format]

In the present embodiment also, a case in which error frames (messages) that are used on a network in accordance with the CAN protocol are exchanged on the bus 30 is utilized as an example to describe the present invention. The error frames are the same as the error frames described above in Embodiment 1 with reference to FIG. 3.

[2.4 Configuration of Steering ECU 300]

Figures 14, 15:
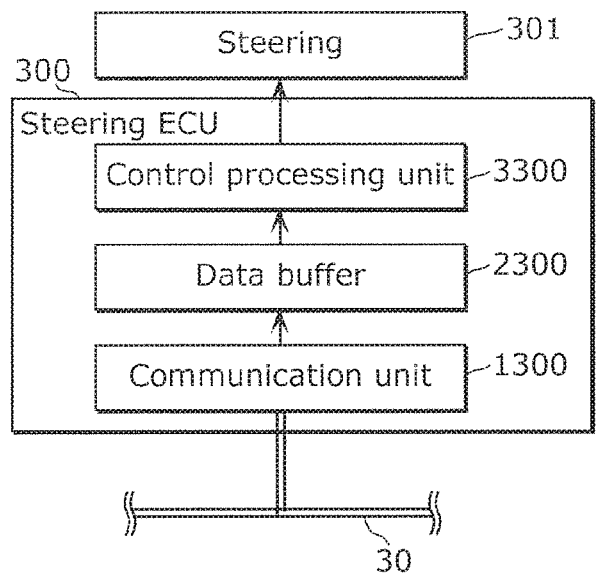
FIG. 14 is a block diagram illustrating an example of the configuration of a steering ECU according to Embodiment 2.
FIG. 15 is a view for describing one example of control indicated by values in a data field of a data frame relating to a steering control instruction that a steering assistance ECU transmits.

FIG. 14 is a block diagram illustrating a configuration example of the steering ECU 300. The steering ECU 300 for controlling the steering 301 includes a communication unit 1300, a data buffer 2300, and a control processing unit 3300.

The communication unit 1300 is an integrated circuit (for example, a communication circuit, a memory, or a processor) that controls communication with respect to the bus 30. The communication unit 1300 includes, for example, a frame transceiving function unit and a received frame interpretation function unit as functional constituent elements.

The frame transceiving function unit, for example, carries out the transmission and receiving of frames with respect to the bus 30 in accordance with the CAN protocol (sequential transmission and receiving of frames bit-by-bit).

In the received frame interpretation function unit, interpretation of the values of a frame that the frame transceiving function unit received is performed so as to map the values into the respective fields in the frame formats specified in the CAN protocol. Based on a value determined as the value of the ID field, the received frame interpretation function unit determines whether or not the frame is a data frame (message) which the steering ECU 300 should receive, and if the ID is not an ID of a frame that should be received, the received frame interpretation function unit aborts interpretation of the relevant frame. Further, in a case where the received frame interpretation function unit determines that a frame does not comply with the CAN protocol, for example, if the values of the CRC do not match or if an item whose value should be fixed to the dominant value has the recessive value, the received frame interpretation function unit transmits an error frame to the frame transceiving function unit. Further, when an error frame is received, that is, when it is interpreted that a received frame is an error frame based on a value in the received frame, the received frame interpretation function unit discards the subsequent part of the frame, that is, aborts interpretation of the frame. In a case where the ID of the received data frame is an ID indicating that the data frame is a frame of a steering control instruction that is determined in advance by the specifications of the in-vehicle network system 10A, the received data frame is determined as being a data frame that should be received by the received frame interpretation function unit of the communication unit 1310. The received frame interpretation function unit stores the contents (ID, and data in the data field, and so forth) of the frame that is determined as being a data frame that should be received, in the data buffer 2300.

The data buffer 2300 is one storage area of a storage medium such as a memory or a register. An ID, and information indicated by values in the data field (for example, information indicating a steering control instruction) as the contents of a data frame received by the communication unit 1310 are stored in the data buffer 2300. Communication arbitration is performed by means of IDs at a time of simultaneous transmission of data frames from a plurality of nodes onto the bus 30. Therefore, a timing at which the steering ECU 300 receives, from the bus 30, a data frame relating to a steering control instruction that the steering assistance ECU 360 transmits does not necessarily exactly match a constant period (for example, 50 ms), and in some cases may deviate somewhat from the constant period. In the steering ECU 300, the data buffer 2300 is used so as to deal with fluctuations in the reception timing that arise due to such effects of the communication arbitration, and so that received data frames can be efficiently processed.

The control processing unit 3300 acquires the contents (information indicating a steering control instruction or the like) of a frame stored in the data buffer 2300 periodically or when a certain condition (a condition associated with storing of frames in the data buffer 2300) is established, and controls the steering 301 by transmitting a control signal to the steering 301 in accordance with the steering control instruction that is indicated by the acquired information.

Note that, similarly to the steering ECU 300, the ECUs other than the steering ECU 300 that are ECUs that can control an actuator (for example the brake ECU 330, the engine ECU 340, and so forth) also include a communication unit, a data buffer, and a control processing unit for controlling the actuator. Further, with regard to the sensor ECU 320 that is connected to a sensor, the sensor ECU 320 includes a processing unit that acquires a measurement result obtained at the sensor and generates a data frame to which a predetermined message ID is added and which includes measurement information that indicates the relevant measurement result, and a communication unit for transmitting the data frame to the bus 30 in accordance with the CAN protocol, and the like. The measurement information shows a measurement result relating to, for example, a recognition result regarding recognition of a detection object, the distance between the vehicle 20A and the detection object, and the speed of the vehicle 20A. Note that, in a case where an ECU that is other than the sensor ECU 320 is connected to a sensor, the ECU in question can include the same kind of constituent elements that the sensor ECU 320 includes.

[2.5 Steering Control Instruction]

FIG. 15 is a view for describing an example of control that values in the data field of a data frame relating to a steering control instruction that the steering assistance ECU 360 transmits indicate. The data field of the frame of the steering control instruction includes a specification with respect to a steering amount by the steering 301, and in FIG. 15 an example of the correspondence between values in the data field and the steering amounts is shown. Note that although information other than the steering amount may also be added in the data field of the frame of the steering amount control instruction, in this example, for convenience in the description, the description will focus only on the steering amount. In this example, the steering amount is indicated by a steering angle of the front wheels that is represented by an 8-bit value. A value of 195 (11000011) indicates a steering angle (0 degrees) for the straight-ahead direction, and values greater than 195 indicate steering angles in the right direction in increments of 0.5 degrees (as far as 30 degrees), while values less than 195 indicate steering angles in the left direction in increments of 0.5 degrees (as far as −30 degrees).

When the steering ECU 300 receives a steering control instruction indicating a steering angle that is different from the current steering angle from the steering assistance ECU 360, the steering ECU 300 actuates the steering 301 in accordance with a difference between the current steering angle and the steering angle which the steering control instruction indicates. Accordingly, the greater that the difference between the current actual steering angle and the steering angle that the steering control instruction indicates is, the greater the amount by which a control signal that the control processing unit 3300 of the steering ECU 300 transmits to the steering 301 causes the steering 301 to operate. Note that, with respect to control of the steering 301 that reflects an operation of the steering wheel by the driver, and control of the steering 301 in accordance with a steering control instruction from the steering assistance ECU 360, in some cases the steering ECU 300 may give priority to one of these controls over the other of these controls in accordance with settings relating to automatic control of steering of the vehicle 20A and the like.

[2.6 Configuration of Security ECU 100A]

Figure 16:
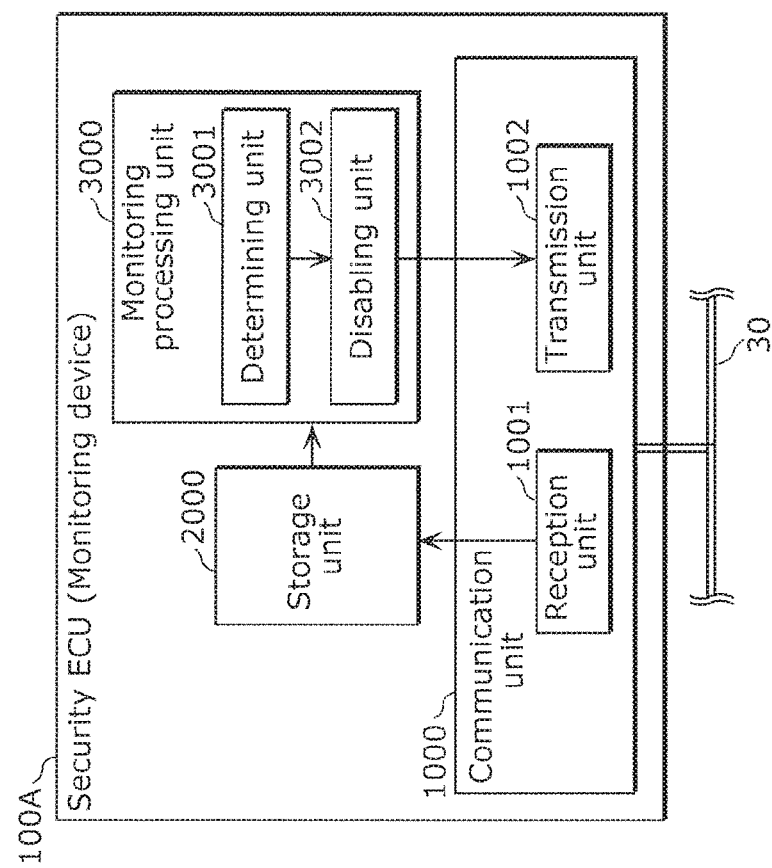
FIG. 16 is a block diagram illustrating an example of the configuration of a security ECU (monitoring device) according to Embodiment 2.

FIG. 16 is a block diagram illustrating a configuration example of the security ECU 100A. The security ECU 100A has a function as a control device that monitors the flow of frames on the bus 30 and, by transmission of an error frame, disables a data frame relating to a false steering control instruction that appears on the bus 30. To realize this function, the security ECU 100A includes a communication unit 1000, a storage unit 2000, and a monitoring processing unit 3000. The respective functions of each of these constituent elements are implemented by, for example, a communication circuit, a storage medium such as a memory, and a processor or digital circuit that executes a control program stored in the memory, or the like that are provided in the security ECU 100A.

The communication unit 1000 is implemented by a communication circuit, and a processor that executes a control program or the like. The communication unit 1000 includes a reception unit 1001 and a transmission unit 1002 for transmitting and receiving frames to and from the bus 30 in accordance with the CAN protocol (sequential transmission and receiving of frames bit-by-bit). The reception unit 1001 receives frames from the bus 30. When a frame from the bus 30 is received by the reception unit 1001, the communication unit 1000 performs interpretation so as to map the values of the frame into the respective fields in the frame format specified in the CAN protocol, and thereby distinguishes the ID (message ID), the DLC, and the data in the data field, respectively, and extracts these items of information from the frame. By referring to IDs that are determined in advance by the specifications of the in-vehicle network system 10A, the communication unit 1000 determines whether the extracted ID is the ID of a frame that the security ECU 100A should receive. If the ID is not the ID of a frame that the security ECU 100A should receive, the communication unit 1000 aborts interpretation of the frame. The reception unit 1001 is an example of an acquisition unit in the present embodiment. The communication unit 1000 stores the contents (ID, data, and the like) of the frame that were acquired by interpreting the frame which the reception unit 1001 received, in the storage unit 2000. Further, upon receiving an instruction to transmit an error frame from the monitoring processing unit 3000, the communication unit 1000 transmits an error frame to the bus 30 by means of the transmission unit 1002.

The frames that the security ECU 100A should receive include the frame of a steering control instruction that is transmitted from the steering assistance ECU 360. Further, a frame indicating at least one kind of information among information indicating the state of the vehicle 20A and information indicating the state in the external environment in which the vehicle 20A is traveling (hereunder, information indicating at least one of these states is also referred to as "state information") is also received by the security ECU 100A. A data frame indicating an enabled (on) or disabled (off) steering assistance function that is transmitted from the steering assistance ECU 360 may be mentioned as an example of a frame that indicates the state of the vehicle 20A. Further, a data frame indicating whether various kinds of assistance functions of the advanced driver assistance system that also include functions other than a steering assistance function are enabled (on) or disabled (off), as well as setting values that were set by the driver or various functions may also be mentioned as an example of a frame that indicates the state of the vehicle 20A. Further, a data frame indicating the current steering angle that is transmitted from the steering ECU 300 can also be received by the security ECU 100A as a frame indicating state information that shows the state of the vehicle 20A. The security ECU 100A also receives data frames including measurement information that are transmitted from other ECUs, such as the sensor ECU 320. Depending on the measurement target, the kinds of measurement information include information indicating the state of the vehicle 20A (for example, the vehicle speed, water temperature, and voltage), and information indicating the state in the external environment (for example, the air temperature outside the vehicle, the state of the road surface, and a result of object recognition).

The storage unit 2000 is one storage area of a storage medium such as a memory for storing the contents of frames received by the reception unit 1001. For example, the aforementioned state information, that is, information such as measurement information transmitted from the sensor ECU 320 and the like, information regarding steering assistance functions that are enabled or disabled which is transmitted from the steering assistance ECU 360, or information indicating the current steering angle that is transmitted from the steering ECU 300 is stored in the storage unit 2000.

The monitoring processing unit 3000 is implemented by a processor that executes a control program or the like, and performs a function of executing disabling processing that disables the data frame of a steering control instruction on the bus 30 under certain conditions. The monitoring processing unit 3000 includes a determining unit 3001 and a disabling unit 3002.

Based on at least one of the state of the vehicle 20A and the state in the external environment in which the vehicle 20A is traveling at a time when the reception unit 1001 receives the data frame of a steering control instruction, and the relevant steering control instruction, the determining unit 3001 determines whether or not the steering control instruction is false (that is, whether or not the data frame of the relevant steering control instruction is a false frame that should be disabled). The determining unit 3001 makes this determination based on the state indicated by the state information that is received by the reception unit 1001 and is stored the storage unit 2000, and the control indicated by the steering control instruction received by the reception unit 1001. This determination is made before a time that all of the data frame of the steering control instruction has been received from the bus 30 by the reception unit 1001 (that is, before the end of the data frame, for example, immediately after reception of the data field or immediately after reception of the CRC sequence). In a case where the determining unit 3001 determines that the steering control instruction is false, the determining unit 3001 outputs the result to that effect to notify the disabling unit 3002.

In a case where it is determined by the determining unit 3001 that a steering control instruction is false, the disabling unit 3002 performs disabling processing that causes the transmission unit 1002 to transmit an error frame to the bus 30 to disable the data frame of the steering control instruction that currently appears on the bus 30. This disabling processing by the disabling unit 3002 is implemented by transmission of an error frame to the bus 30 prior to completing reception of the end of the data frame (EOF) of the steering control instruction. When the disabling processing is performed, the data frame of the steering control instruction on the bus 30 is overwritten, and hence the data frame of the false steering control instruction is discarded and steering control in accordance with the steering control instruction in question by the steering ECU 300 is avoided.

[2.7 Determination of False Steering Control Instruction]

Hereunder, a method by which the determining unit 3001 of the monitoring processing unit 3000 in the aforementioned security ECU 100A (monitoring device) determines whether or not a steering control instruction is false will be described.

The determining unit 3001 determines that a steering control instruction is a false control instruction in a case where, based on control indicated by the steering control instruction acquired from a data frame received by the reception unit 1001, and a state indicated by state information that is stored in the storage unit 2000, the steering control instruction indicates control that is not consistent with the state indicated by the state information, that is, the state and the control are inconsistent with each other. Hereunder, a description regarding such kind of inconsistency between the state and the control will be described using an example.

[2.7.1 Inconsistency regarding Direction of Travel]

For example, a case where the state that the state information indicates is that the vehicle 20A should travel in a first direction, and a steering control instruction indicates control that causes the vehicle 20A to travel in a second direction that is different from the first direction corresponds to the aforementioned inconsistency.

A more specific example will now be described. That is, based on a recognition result obtained from the sensor ECU 320, the state information stored in the storage unit 2000 indicates a state to the effect that another vehicle is traveling directly beside the vehicle 20A in a traffic lane that is on the right side of the traffic lane in which the vehicle 20A is traveling. In other words, the state is a state in which the vehicle 20A should travel in a direction that follows along the traffic lane in which the vehicle 20A is currently traveling or in a direction to enter a traffic lane on the left side of the traffic lane in which the vehicle 20A is currently traveling. These directions are examples of the first direction. In a case where the contents of steering control that are compared with the aforementioned state cause the vehicle 20A to travel in a direction to enter the traffic lane on the right side of the traffic lane in which the vehicle 20A is currently traveling, the determining unit 3001 determines that there is an inconsistency between the state and the control.

As another example, it will be assumed that the state information indicates a state to the effect that a lane keeping function that is one of the steering assistance functions in the vehicle 20A is enabled (on), and the vehicle 20A is traveling close to the left side within the traffic lane in which the vehicle 20A is traveling. That is, the aforementioned state is a state such that, by control of the lane keeping function, as a target route that the vehicle 20A should travel in order to stay in the traffic lane in which the vehicle 20A is currently traveling, the vehicle 20A follows a route that, to a certain extent, is in the rightward direction relative to the direction along the traffic lane. In a case where the contents of steering control that are compared with the aforementioned state indicate steering that causes the vehicle 20A to follow a route in a direction along the traffic lane or in a more leftward direction, the determining unit 3001 determines that there is an inconsistency between the state and the control.

As another example, it will be assumed that the state information indicates a state to the effect that a parking assistance function that is one of the steering assistance functions in the vehicle 20A is being executed. Further, it will be assumed that state information indicating a target parking position of the vehicle 20A is also stored in the storage unit 2000 that is based on information from the sensor ECU 320 or on the content of a setting (a selection or adjustment) that was set by the driver with respect to the steering assistance ECU 360. For example, if the content of the setting for parking assistance is "left-side parallel parking", the target parking position is in the left-rearward direction from the vehicle 20A. In this case, the state that the state information indicates a state to the effect that steering control in the left direction is to be executed by means of the parking assistance function in order for the vehicle 20A to enter the target parking position. In a case where the contents of steering control that are compared with the aforementioned state indicate steering in a direction that is different from the direction toward the target parking position, for example, steering in the rightward direction, the determining unit 3001 determines that there is an inconsistency between the state and the control.

As a further example, it will be assumed that the state information indicates a state to the effect that steering to change the traffic lane of the vehicle 20A is being executed by a lane changing function that is one of the steering assistance functions in the vehicle 20A. In addition, it will be assumed that information which is the same as information the steering assistance ECU 360 uses for the parking assistance function such as whether or not there is an object in front of or around the vehicle 20A and, if there is an object, the relative speed of the vehicle 20A with respect to the object, that is information from the sensor ECU 320, is also stored in the storage unit 2000 as state information.

Further, it will be assumed that the state information indicates a state to the effect that it is possible for the vehicle 20A to change lanes from a traffic lane that is furthest on the left side to a traffic lane adjacent to the right side. In a case where the contents of steering control that are compared with the aforementioned state indicate steering in a direction that is different from the direction in which the traffic lane that is the destination of the lane change of the vehicle 20A, for example, steering in the leftward direction or steering in a direction such that the vehicle 20A stays in the same traffic lane, the determining unit 3001 determines that there is an inconsistency between the state and the control.

[2.7.2 Inconsistency Relating to Steering Amount]

For example, a case where the state that the state information indicates is a state to the effect that the vehicle 20A should be steered by a steering amount that is not more than a first predetermined value, and a steering control instruction indicates control specifying a steering amount that is greater than the first predetermined value, or a case where the relation between the sizes of the steering amounts is the opposite thereto, corresponds to the aforementioned inconsistency.

That is, in a case where a steering control instruction indicates control specifying a steering amount that deviates from the range of an authentic steering amount with respect to certain state of the vehicle 20A indicated by the state information, or deviates from an optimal steering amount and an allowable range of values around the optimal steering amount (hereunder, these ranges relating to the steering amount are not particularly differentiated, and are also be referred to as "predetermined range"), the determining unit 3001 determines that the steering control instruction is a false control instruction. A predetermined range of operation amounts that can be applied in accordance with state that the state information indicates may be determined by the determining unit 3001 using, for example, a mathematical formula or a table. In a case where a circumstance that the state information indicates is a numerical value, the determining unit 3001 may use a predetermined range that is based on a result obtained by inputting the numerical value into a mathematical formula. Further, for example, mathematical formulas or tables may be used that differ according to the state that the state information indicates. Note that, the predetermined range need not be a range for which both an upper limit value and a lower limit value are defined, and may be a range for which one of an upper limit value such as the aforementioned first predetermined value and a lower limit value (example of a second predetermined value in the present embodiment) is defined.

A more specific example will now be described. It will be assumed that, for example, a mathematical formula or a table for determining an upper limit of a safe steering amount with respect to a vehicle speed that is determined in advance for the vehicle 20A is stored in the storage unit 2000. In this case, the state information stored in the storage unit 2000 indicates the current speed of the vehicle 20A. That is, the state in this case is a state such which the vehicle 20A should be steered by a steering amount that is less than a steering amount that is the upper limit determined using the aforementioned mathematical formula or table. The value of the steering amount that is the upper limit is an example of the first predetermined value. In a case where the contents of steering control that are compared with the aforementioned state indicate a steering amount that is larger than the steering amount that is the upper limit, the determining unit 3001 determines that there is an inconsistency between the state and the control.

Furthermore, for example, the state may be a state relating to whether any of the steering assistance functions of the vehicle 20A is enabled (on) or disabled (off).

It will be assumed that the acquired state information indicates a state in which the lane keeping function that is one of the steering assistance functions in the vehicle 20A is disabled (off). That is, the state is a state in which a steering control instruction for a lane keeping function is not output from the steering assistance ECU 360. Further, it is assumed that an upper limit value of a steering amount of a steering control instruction that can be output from the steering assistance ECU 360 even in a case where the lane keeping function is disabled is stored in the storage unit 2000. In a case where, in such a state, an acquired steering control instruction indicates control indicating a steering amount that is outside this predetermined range, the determining unit 3001 determines that there is an inconsistency between the circumstances and the control. The range of steering amounts defined by the aforementioned upper limit value is an example of a third predetermined range in the present embodiment.

Further, as another example, it will be assumed that a mathematical formula or a table or the like for determining a predetermined range of steering amounts based on whether or not to stay in the traffic lane is also stored in the storage unit 2000. In a case where the acquired state information indicates, as a state of the vehicle 20A, the vehicle speed and that the lane keeping function that is one of the steering assistance functions is enabled (on), the determining unit 3001 acquires a predetermined range of steering amounts in accordance with the vehicle speed and lane keeping function which the state information indicates, and compares a steering amount of control that a steering control instruction indicates and the upper limit value and lower limit value of the predetermined range. If the steering amount of the control that the steering control instruction indicates is outside of the predetermined range, the determining unit 3001 determines that there is an inconsistency between the state and the control. This predetermined range is an example of a fourth predetermined range in the present embodiment.

As a further example, it will be assumed that state information indicates a state in which the parking assistance function that is one of the steering assistance functions in the vehicle 20A is being executed. Further, it will be assumed that state information indicating a parking route that is a route for the vehicle 20A to take to reach a target parking position is received from the steering assistance ECU 360 and is stored in the storage unit 2000. Based on such state information, a steering control amount for causing the vehicle 20A to travel along the parking route, or also a permissible deviation therefrom, can be calculated and acquired as a state of the vehicle 20A. In a case where the contents of steering control that are compared with such a state indicate an excessively large or excessively small steering amount, even if, for example, the steering direction is the same as the steering direction that the parking route indicates, the determining unit 3001 determines that there is an inconsistency between the state and the control. In this example, the calculated steering control amount or an upper limit to which a permissible deviation was added is a specific example of the first predetermined value in the present embodiment. Further, the calculated steering control amount or a lower limit that was reduced by a permissible deviation is a specific example of the second predetermined value in the present embodiment.

Note that, information which the state information indicates is not limited to a state within the vehicle 20A as described above, and for example may include traffic lane information as a recognition result with respect to the external environment that is provided from the sensor ECU 320, or map information acquired from, for example, a car navigation system or from outside the vehicle 20A through a communication network. By this means, an upper limit or predetermined range of steering amounts which allow the vehicle 20A to safely stay in a traffic lane may be further determined in accordance with the shape or curve radius or the like of the traffic lane or road along which the vehicle 20A is traveling.

[2.7.3 Inconsistency Relating to Automatic Control/Manual Control of Steering]

For example, a case where a state that the state information indicates is a state to the effect that the vehicle 20A should be driven by manual steering, and a steering control instruction indicating control for a steering amount outside a predetermined range is received from the steering assistance ECU 360 or a steering control instruction is received within a predetermined time period after the occurrence of manual steering control corresponds to the above-mentioned inconsistency. This is an inconsistency that is based on whether or not, in a state in which a mode is enabled in which steering is basically performed by manual control in the vehicle 20A, control that is to be executed indicates a steering amount that exceeds the degree of auxiliary steering control that should be executed by the steering assistance ECU 360 even in such a state. The predetermined range in this case is an example of a first predetermined range in the present embodiment.

Further, a case where a state that the state information indicates is a state such that the vehicle 20A should be driven by means of automatic steering, and a steering control instruction indicating control for a large steering amount that is outside a predetermined range is received from the steering assistance ECU 360 or a steering control instruction is not received within a predetermined time period from a time at which the immediately preceding steering control instruction was generated corresponds to the above-mentioned inconsistency. This is an inconsistency that is based on whether or not, in a state in which a mode is enabled in which steering is performed by automatic control in the vehicle 20A, the control deviates from the steering control that should be executed by automatic control that is determined in advance or the timing of the steering control instruction deviates from a predetermined transmission timing for a data frame. The predetermined range in this case is an example of a second predetermined range in the present embodiment.

[2.8 Monitoring Processing by Security ECU 100A]

Figure 17:
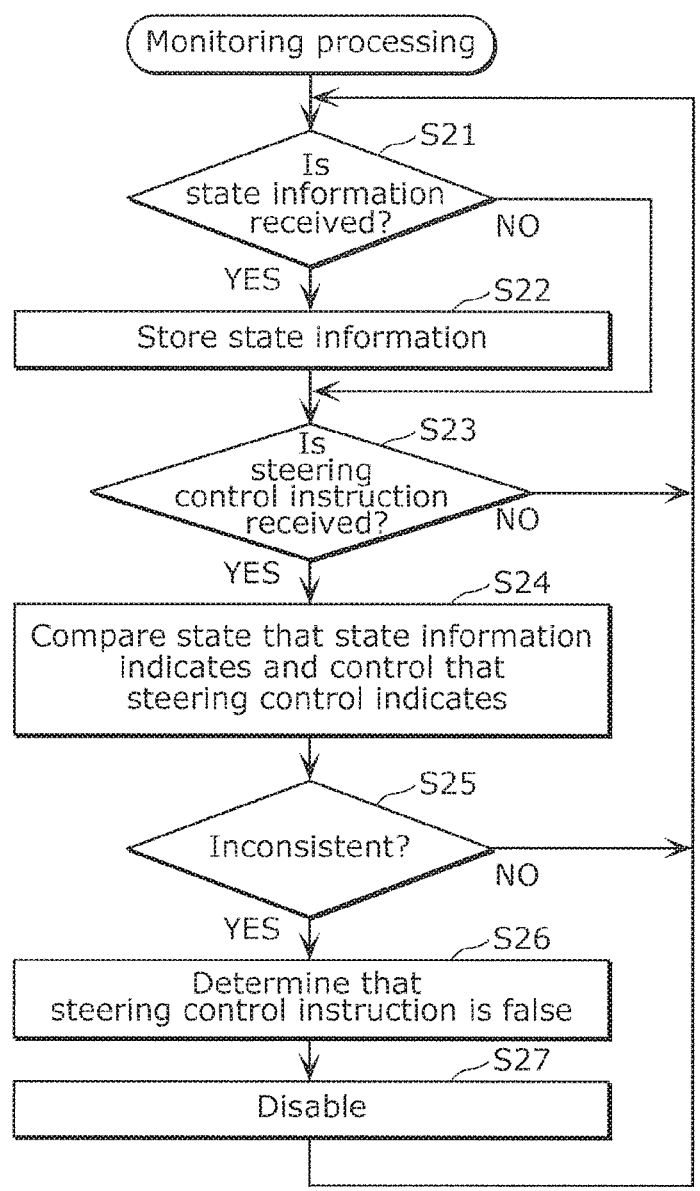
FIG. 17 is a flowchart illustrating an example of procedures of monitoring processing executed by a security ECU according to Embodiment 2.

FIG. 17 is a flowchart illustrating an example of the procedures of monitoring processing executed by the security ECU 100A in the in-vehicle network system 10A. Hereunder, monitoring processing that is executed by the security ECU 100A as processing to deal with an attack frame of a false steering control instruction will be described with reference to the procedures in FIG. 17.

In a case where the reception unit 1001 receives a data frame including state information from the bus 30 (Yes in step S21), the received state information is stored in the storage unit 2000 (step S22). Data frames including state information are periodically transmitted from the sensor ECU 320 and the like, and the reception and storage of state information in step S22 is repeatedly performed.

In a case where the reception unit 1001 receives a data frame of a steering control instruction from the bus 30 (Yes in step S23), the determining unit 3001 compares the state indicated by the most recent state information stored in the storage unit 2000 and the control that the received steering control instruction indicates (step S24). Based on this comparison, the determining unit 3001 determines whether or not the state and the control are inconsistent with each other (step S25), and if the state and the control are inconsistent with each other (Yes in step S25), the determining unit 3001 determines that the steering control instruction relating to the data frame received in step S23 is false. Note that, if reception up to the data field of the data frame of the steering control instruction is completed by the reception unit 1001, the control for steering that the steering control instruction indicates can be acquired, and hence the determining unit 3001 can execute the steps from step S24 onward.

The disabling unit 3002 disables the data frame of a steering control instruction that is determined as false in step S26, by causing the transmission unit 1002 to transmit an error frame (step S27).

[2.9 Processing Sequence Relating to Steering Control in In-vehicle Network System 10A]

Figure 18:
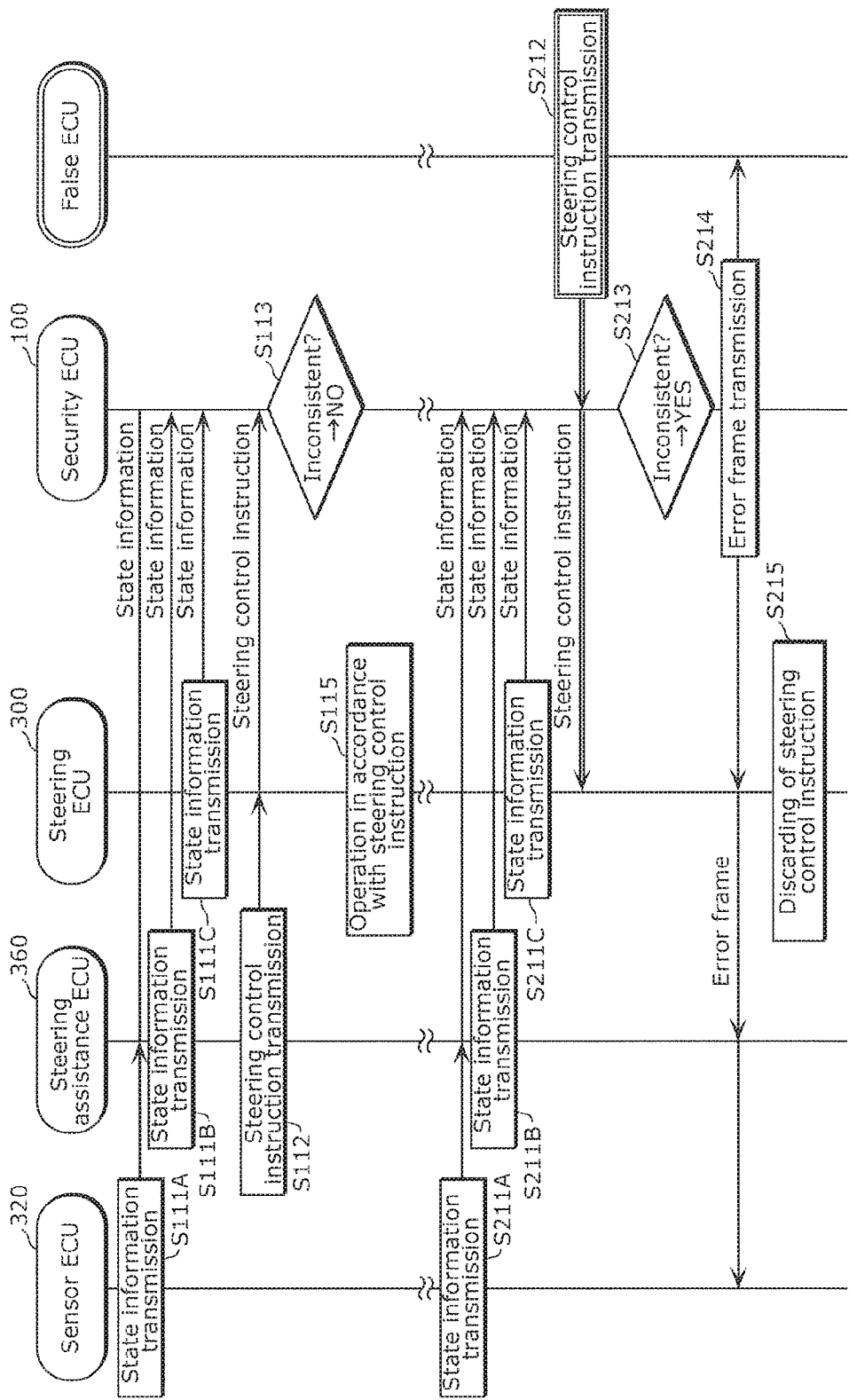
FIG. 18 is a view illustrating an example of a processing sequence relating to steering control in Embodiment 2.

FIG. 18 illustrates an example of a processing sequence relating to steering control in the in-vehicle network system 10A. Hereunder, the operations of the respective ECUs in the in-vehicle network system 10A will be described with reference to FIG. 18. Note that, the term "false ECU" as used herein refers to any ECU in the in-vehicle network system 10A (including ECUs that are not shown in the drawings) that is, for example, an ECU which is connected to the diagnostic port 390 by an attacker or is an ECU which is hijacked by an attacker by overwriting firmware thereof or the like. Further, for convenience in illustrating a contrast between the different kinds of processing to be executed, the first half (upper half) of the processing sequence is an example of a case where a false data frame is not transmitted, and the second half (lower half) of the processing sequence is an example of a case where a false data frame is transmitted.

The sensor ECU 320 transmits a data frame that includes state information showing a measurement result that was measured by the object detection sensor 321 or the speed sensor 322 to the bus 30 (step S111A). The steering assistance ECU 360 and the security ECU 100A receive the data frame from the bus 30. Further, the steering assistance ECU 360 transmits a data frame including information indicating whether various operation assistance functions are enabled or disabled to the bus 30 (step S111B). The security ECU 100A receives the aforementioned data frame from the bus 30. The steering ECU 300 transmits a data frame showing the current steering angle to the bus 30 (step S111C). The security ECU 100A receives the aforementioned data frame from the bus 30. In this way, the security ECU 100A acquires state information showing the state of the vehicle 20A and the state of the external environment in which the vehicle 20A is traveling.

Based on the state information transmitted by the sensor ECU 320 in step S111A, the steering assistance ECU 360 transmits a steering control instruction for an enabled steering assistance function, for example, a data frame indicating a steering angle for staying in the traffic lane as control to the bus 30 (step S112). The steering ECU 300 and the security ECU 100A receive the aforementioned data frame from the bus 30.

The security ECU 100A that receives the aforementioned data frame and thereby acquires the steering control instruction determines whether the control that the steering control instruction indicates is inconsistent with the state indicated by the state information that was transmitted in steps S111A to 111C (step S113). In this example, since the control is not inconsistent with the state indicated by the state information, the security ECU 100A does not execute disabling processing with respect to the data frame transmitted in step S112. The steering ECU 300 operates in accordance with the acquired steering control instruction (step S115).

Next, in a similar manner to steps S111A to S111C, the sensor ECU 320, the steering assistance ECU 360, and the steering ECU 300 each transmit a data frame showing newer state information to the bus 30 (steps S211A, S211B, and S211C). The security ECU 100A acquires these items of newer state information.

A false ECU then transmits a false data frame that contains a steering control instruction for the purpose of an attack (step S212). The steering ECU 300 and the security ECU 100A receive the false data frame from the bus 30.

The security ECU 100A that receives the aforementioned data frame and thereby acquires the steering control instruction determines whether the control that the steering control instruction indicates is inconsistent with the state indicated by the state information that was transmitted in steps S211A to 211C (step S213). In this example, because the control is inconsistent with the state indicated by the state information, as disabling processing with respect to the data frame that was transmitted in step S212, the security ECU 100A transmits an error frame to the bus 30 while the relevant data frame is appearing on the bus 30. The steering ECU 300 that received the error frame discards the data frame that was transmitted in step S212 which the steering ECU 300 was in the process of acquiring (step S215).

The foregoing is a description that uses an example of a processing sequence relating to steering control in the in-vehicle network system 10A. However, a processing sequence relating to steering control in the in-vehicle network system that includes the security ECU 100A according to the present embodiment is not limited to the foregoing example. For example, the security ECU 100A need not always use the latest state information of all kinds for determining whether there is an inconsistency. Further, a determination as to whether there is an inconsistency may be executed a plurality of times using the same state information. For example, although a description was omitted for the purpose of simplicity in the foregoing example, the data frame of a steering control instruction may be transmitted from the steering assistance ECU 360 also after step S211, and the security ECU 100A may acquire a steering control instruction from this data frame and make a determination as to whether there is an inconsistency. According to the CAN protocol, the data frame of a control instruction with respect to the same control object is periodically transmitted, and in some cases a false data frame for the purpose of an attack is transmitted at a time that is very close to an authentic data frame so as not to be rejected in accordance with the period rules. With respect to such kind of attack also, a false data frame which is determined as indicating control that is inconsistent with the state based on the result of comparing the state that the state information indicates and the contents of the control instruction is appropriately disabled.

[2.10 Advantageous Effects of Embodiment]

In the in-vehicle network system 10A according to the present embodiment, immediately before reception of a steering control instruction (that is, a data frame of a steering control instruction) is completed by the reception unit 1001, on the basis of state information that is acquired from another device such as the sensor ECU 320, the monitoring processing unit 3000 of the security ECU (monitoring device) 100A determines by a predetermined method whether the control of the relevant steering control instruction is inconsistent with the state that the state information indicates. If the control is inconsistent, disabling processing that disables the relevant steering control instruction by transmission of an error frame is performed. With respect to the predetermined method, various combinations of a state and control can be defined in advance to serve as a reference for determining an inconsistency. Since a false data frame that includes steering control that is inconsistent with the state are disabled on the bus 30 by transmission of an error frame from the security ECU 100A, it is possible to prevent the occurrence of a situation in which the steering ECU 300 completes reception of the false data frame and controls the steering 301 in accordance with a steering control instruction that the data frame in question contains. That is, in the in-vehicle network system 10A, an appropriate countermeasure to deal with a false frame (attack frame) relating to a steering control instruction is executed by the security ECU 100A, and it is possible to prevent an accident that could be caused by the attack frame.

(Variations of Embodiment 2)

As described above, Embodiment 2 has been described as an illustrative example of the technology according to the present invention. However, the technology according to the present invention is not limited to the above embodiment, and is also applicable to the present embodiment that has been subjected to modifications, replacements, additions, omissions, and the like appropriately. For example, the following variations are also included in embodiments of the present invention.

Figure 19:
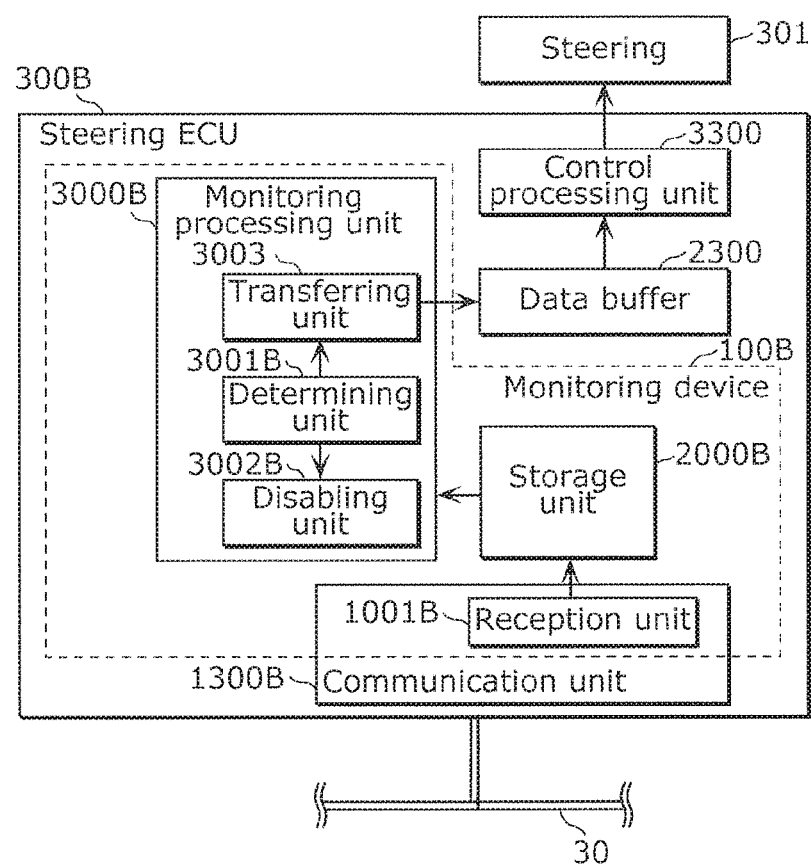
FIG. 19 is a block diagram illustrating an example of the configuration of a steering ECU according to one variation of Embodiment 2.

(1) In Embodiment 2 that is described above, a monitoring device that is implemented by the security ECU 100A that performs a function for ensuring the security of the in-vehicle network system 10A may be implemented as one part of the steering ECU 300. In this case, discarding of a data frame that contains a false steering control instruction may be executed as disabling processing by the disabling unit 3002. FIG. 19 is a block diagram illustrating a configuration example in which a steering ECU includes a monitoring device as one part thereof.

In addition to the constituent elements of the steering ECU 300 in Embodiment 2, a steering ECU 300B according to the present variation also includes a storage unit 2000B and a monitoring processing unit 3000B. Further, a communication unit 1300B of the steering ECU 300B performs the functions of both the communication unit 1300 and the communication unit 1000 which the security ECU 100A includes in Embodiment 2. Among these functions, a portion that corresponds to the reception unit 1001 of the communication unit 1000 is described as a reception unit 1001E in the description of the steering ECU 300B. According to the present variation, the storage unit 2000B, the monitoring processing unit 3000B, and the reception unit 1001E constitute a monitoring device 100E inside the steering ECU 300B. Hereunder, the differences between the monitoring device 100B and the security ECU 100A that is the monitoring device in Embodiment 2 are mainly described.

As mentioned above, the reception unit 1001B corresponds to the reception unit 1001 of the communication unit 1000 of the security ECU 100A in Embodiment 2. The storage unit 2000B corresponds to the storage unit 2000 of the security ECU 100A. In addition to a determining unit 3001B that corresponds to the determining unit 3001, and a disabling unit 3002B that corresponds to the disabling unit 3002 of the monitoring processing unit 3000 of the security ECU 100A, the monitoring processing unit 3000B includes a transferring unit 3003.

In addition to data frames that the steering ECU 300 receives, the reception unit 1001B also receives data frames including state information from other ECUs. Note that, in the present variation, the state information which the security ECU 100A receives from the steering ECU 300 in Embodiment 2 is acquired by the monitoring processing unit 3000B inside the steering ECU 300B.

Figure 20:
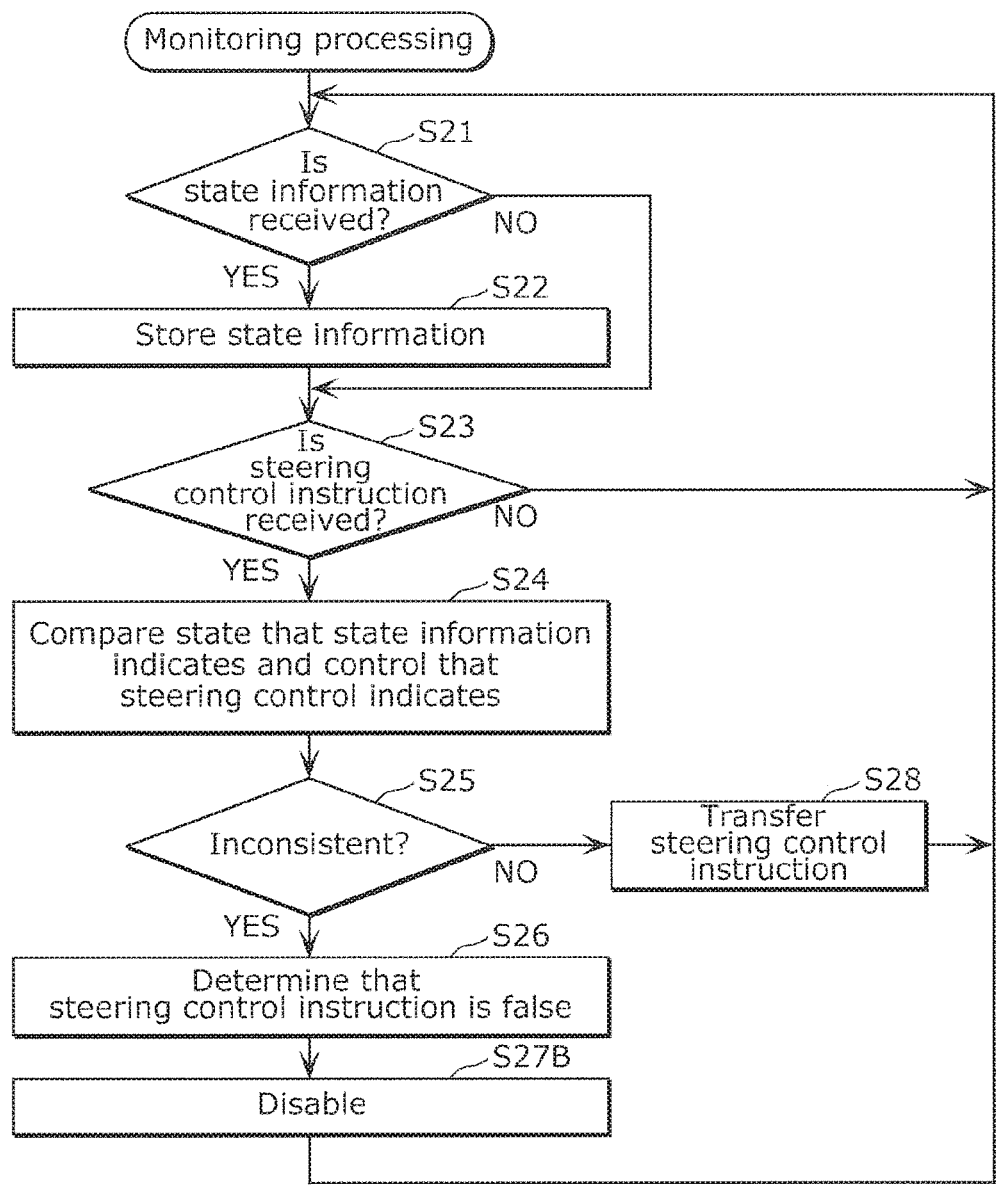
FIG. 20 is a flowchart illustrating an example of procedures of monitoring processing executed by a monitoring device according to the aforementioned variation.

In the monitoring processing unit 3000B, similarly to the determining unit 3001, the determining unit 3001B makes a determination (step S25 in FIG. 17) by comparing the state that the state information indicates and the control that is indicated by the steering control instruction from the steering assistance ECU 360, and outputs the result of the determination. However, the processing in a case where it is determined that the state and the control are not inconsistent with each other differs from the processing performed in such a case by the determining unit 3001. FIG. 20 is a flowchart illustrating an example of procedures of monitoring processing that includes this difference, which is executed by the monitoring device 100B of the steering ECU 300B. In this case (No in step S25), the determining unit 300B which determined that the steering control instruction is not false notifies that result to the transferring unit 3003. Upon receiving the notification, the transferring unit 3003 stores the contents (ID, data in the data field, and the like) of the data frame relating to the relevant steering control instruction in the data buffer 2300 (step S28).

In the monitoring processing unit 3000B, in a case where it is determined that the state and the control are inconsistent with each other and the steering control is thus false (Yes in step S25; step S26), the disabling unit 3002B that receives a notification to this effect discards the data frame relating to the steering control instruction in question (step S27B).

Figure 21:
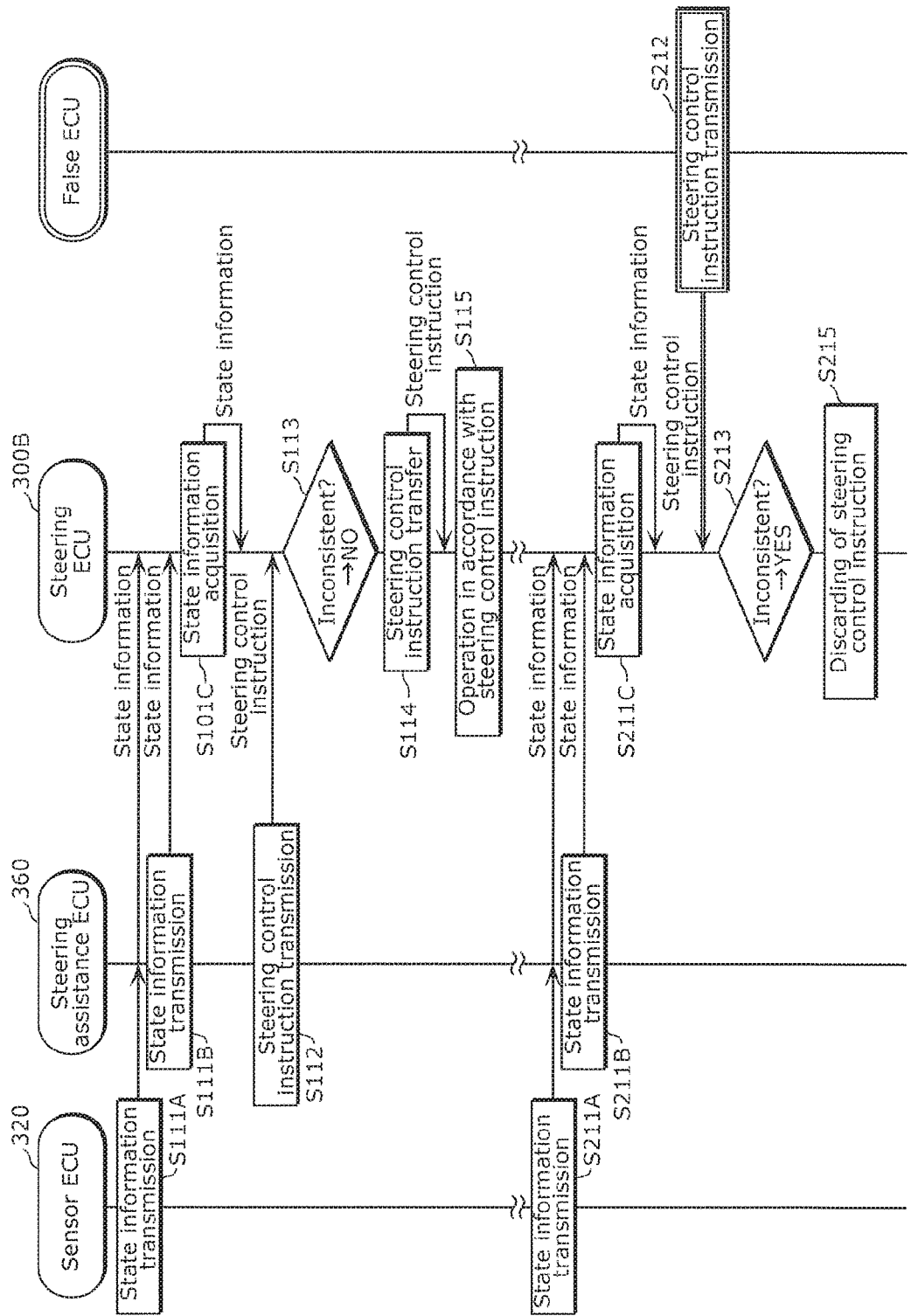
FIG. 21 is a view illustrating an example of a processing sequence relating to steering control in the aforementioned variation.

FIG. 21 illustrates an example of a processing sequence relating to steering control in the in-vehicle network system 10A that includes the steering ECU 300B. The processing sequence illustrated in FIG. 21 differs from the processing sequence of Embodiment 2 illustrated in FIG. 18 in the respect that the steering ECU 300B acquires each item of state information, the steering ECU 300B makes a determination regarding an inconsistency (steps S113 and S213), and the steering ECU 300B executes an operation to transfer the steering control instruction in a case where the state and the control are not inconsistent with each other (step S114).

Note that, in addition, similarly to the disabling unit 3002, the disabling unit 3002B may cause the communication unit 1300B to transmit an error frame to the bus 30.

(2) The state of the vehicle or the state of the external environment in which the vehicle is traveling that are indicated by the state information and are to be compared with the control of a steering control instruction by the determining units 3001 and 3001B are not limited to the state described above in Embodiment 2. For example, contents indicating road traffic signs or road markings at a place that the vehicle is traveling through or a planned travel route of the vehicle may also be included in the state of the external environment that the state information indicates. For example, it may be determined whether or not the control of a steering control instruction is inconsistent with a state of a regulation relating to changing course or to entry. Further, for example, a state that can influence a safe steering amount such as the weather, air temperature, state of the road surface, a movable load or a balance thereof, a state regarding changes in the vehicle speed, or the type, air pressure, or degree of deterioration of the tires, or the like may also be included in the state of the vehicle or the external environment that the state information indicates. Such information can be acquired from, for example, a sensor mounted in the vehicle, a system that provides road traffic information such as VICS (registered trademark), or a service provided on the Internet. The determining unit 3001 or 3001B may make a determination regarding an inconsistency using as a reference, in addition to the traveling speed of the vehicle, whether or not a steering amount that a steering control instruction indicates can be safely executed with respect to these states. For example, a reference that differs depending on these states that the state information indicates may be used, or a discriminant function or a discriminant model that adopts these states as input values may be used.

(3) References that differ for each type of vehicle with respect to the vehicle 20A may be used as references for determining whether or not a steering control instruction is inconsistent with a state as described in the foregoing Embodiment 2 and variations thereof. Here, the term "type of vehicle" may refer to a type that is identified according to the vehicle model, or may refer to a more detailed grading. Further, the type of vehicle may be further distinguished according to the presence or absence of a predetermined function realized by an option or the like.

Further, even in the case of the same function, references that differ depending on differences in the function may be used. For example, the types of the lane keeping function that is one of the steering assistance functions include a type that operates in a case where a distance to a lane-dividing line is equal to or less than a certain distance, and a type that recognizes the center of the traffic lane and always aligns the center of the vehicle with the center of the traffic lane. In the respective states in which these different types of lane keeping functions are functioning, references for which a determination as to whether or not there is an inconsistency with respect to a steering direction or a steering amount differs may be used.

Further, in a self-driving vehicle in which a high level of automated driving is possible, a determination that also includes switching of references may be performed. For example, when comparing a time when an operation to stay in a traffic lane is executed and a time when an operation to change a traffic lane executed, a threshold value of a steering amount that is a reference for determining an inconsistency with respect to the state is larger at the time of executing the operation to change the traffic lane. Therefore, a determining unit of a monitoring device of a self-driving vehicle that normally enables the lane keeping function when the vehicle is traveling and executes an operation to change traffic lanes in accordance with the rate of decrease in the following distance with respect to the preceding vehicle or in accordance with the relative speed of its own vehicle with respect to the preceding vehicle that is acquired as state information, may switch a threshold value of a steering amount for determining an inconsistency to a larger threshold value when a lane changing function starts.

(4) The division of functions among the various constituent elements in the in-vehicle network system 10A described in the foregoing embodiment or variations thereof or in a control network system that includes the in-vehicle network system 10A is one example, and the division of functions described above can be changed. Further, some of the functions of the monitoring processing unit 3000 and the like in the security ECU 100A or the monitoring processing unit 3000B in the steering ECU 300B may be performed by a device that can communicate with the security ECU 100A, for example, another ECU in the in-vehicle network system 10A, or a server apparatus that is outside of the in-vehicle network system 10A or the like. For example, in the embodiment described above, another security ECU that is different from the security ECU 100A may be included in the in-vehicle network system 10A, and among the functions of the monitoring processing unit 3000, the function of the disabling unit 3002 may be performed by the other security ECU. In this case, the result of a determination that is output from the determining unit 3001 may be transmitted to the bus 30 from the transmission unit 1002 as a data frame, or may be transmitted to the other security ECU using a dedicated line.

(5) One aspect of the present invention may be a monitoring method that includes, for example, all or some of the processing procedures described in FIG. 17 and FIG. 18, FIG. 20 and FIG. 21, and also the descriptions relating to these drawings in the present specification. For example, the monitoring method may include: an acquisition step (for example, steps S21 and S23) of acquiring state information indicating at least one of a state of the vehicle 20A and a state of the external environment in which the vehicle 20A is traveling, and also a steering control instruction that is transmitted in the in-vehicle network system 10A; a determination step (for example, step S24) of determining whether or not the steering control instruction is a false control instruction by comparing the state that the acquired state information indicates with the control indicated by the acquired steering control instruction; and an output step (for example, step S25) of outputting information that shows the result of the determination performed in the determination step. Further, the monitoring method may also include a disabling step (for example, step S27 or S27B) of disabling the steering control instruction in a case where it is determined by the determination step that the steering control instruction is a false control instruction. This kind of method is executed, for example, by an ECU that functions as a monitoring device that monitors steering control instructions for steering the vehicle 20A that are transmitted in the in-vehicle network system 10A.

Further, as one aspect of the present invention, the processing relating to the monitoring method may be a computer program that a computer is caused to execute, or may be a digital signal composed of the computer program. The processing relating to the monitoring method is processing that includes: an acquisition step (for example, steps S21 and S23) of acquiring state information indicating at least one of a state of the vehicle 20A and a state of the external environment in which the vehicle 20A is traveling, and also a steering control instruction that is transmitted in the in-vehicle network system 10A; a determination step (for example, step S24) of determining whether or not the steering control instruction is a false control instruction by comparing the state that the acquired state information indicates with the control indicated by the acquired steering control instruction; and an output step (for example, step S25) of outputting information that shows the result of the determination performed in the determination step. The information that is output may be used as an input to another program module or computer program, or to another device that is capable of communication. For example, disabling of a data frame, disabling of a steering assistance ECU, automated driving for emergency stopping, presentation to the driver of a notification relating to the occurrence of an attack, or recording of an error log or the like may be executed by the aforementioned other program module or the like.

(6) Processing for disabling that is performed in the above described embodiment and the variations thereof is not limited to processing that disables by sending an error frame to a CAN bus. Discarding of a data frame that is executed by the steering ECU 300B that is described above is also one form of disabling processing. As another example, not transferring a data frame containing a false steering control instruction by a monitoring device that is implemented as a part of a gateway in a network is also included as one form of disabling processing.

(Other Variations)

Two embodiments and variations of each of the embodiments have been described above as examples of the technology according to the present invention. The technology according to the present invention is not limited to the above embodiments and variations, and for example, the following variations that can be applied to each embodiment are also included in embodiments of the present invention.

(1) Although examples of application of the present invention in an in-vehicle network system in which the standard format illustrated in FIG. 2 is used as the format with respect to the data frames in the CAN protocol are described as the foregoing embodiments, a network system to which the present invention can be applied is not limited to thereto. For example, the present invention can be applied to a network in which data frames in the extended format flow. The CAN protocol described in the above embodiments may be understood as having a broad meaning that also includes its derivative protocols, such as TTCAN (Time-Triggered CAN) and CAN FD (CAN with Flexible Data Rate). Further, the present invention can also be applied to a network system that conforms to a protocol other than CAN, such as Ethernet (registered trademark) or FlexRay (registered trademark), or to a network system which utilizes a mixture of a plurality of protocols.

(2) Forms that are realized by arbitrarily combining constituent elements and functions in the respective embodiments and the respective variations described above are also included in the scope of the present invention. For example, an electronic control device according to one aspect of the present invention may include: an acquisition unit that acquires state information indicating at least one of a state of a movable body and a state of an external environment in which the movable body is moving, and a control instruction indicating at least one of a steering control instruction for steering the movable body and an acceleration control instruction for adjusting acceleration of the movable body; and a determining unit that determines whether the control instruction is a false control instruction based on the at least one state indicated by the state information acquired and control indicated by the control instruction acquired.

(3) The individual ECUs in the embodiments described above are each assumed to be a device including, for example, digital circuits such as a processor and a memory, analog circuits, a communication circuit, and so forth, but may include other hardware components such as a hard disk drive, a display, a keyboard, and a mouse. In addition, instead of implementing the functions of the respective devices described in the above embodiments through use of software by having a processor execute a control program stored in a memory, the functions of the respective devices may be implemented by dedicated hardware (such as a digital circuit).

(4) Some or all of the constituent elements included in each device in the embodiments described above may be constituted by a single system LSI (Large Scale Integration: large scale integrated circuit). The system LSI is a super-multifunctional LSI manufactured by integrating a plurality of configuration units on one chip, and is specifically a computer system configured to include a microprocessor, a ROM, a RAM, and so forth. A computer program is recorded on the ROM. The microprocessor operates in accordance with the computer program, thereby allowing the system LSI to achieve its function. In addition, constituent elements constituting the respective devices described above may be integrated into individual chips or into a single chip that includes some or all of the constituent elements. While the term "system LSI" is used here, an integrated circuit may also be referred to as an "IC", an "LSI", a "super LSI", or an "ultra LSI" depending on the difference in the degree of integration. In addition, a technique for forming an integrated circuit is not limited to the LSI, and may be implemented by using a dedicated circuit or a general-purpose processor. A FPGA (Field Programmable Gate Array) that can be programmed after the manufacture of the LSI, or a reconfigurable processor capable of reconfiguring connections and settings of circuit cells in the LSI may also be utilized. Additionally, if a technique for forming an integrated circuit is introduced in place of the LSI along with development in semiconductor technology or other derivative technology, naturally the technique may be used for the integration of functional blocks. The application of biotechnology or the like is one potential possibility.

(5) Some or all of the constituent elements included in each of the devices described above may be constituted by an IC card removably set in each device or a stand-alone module. The IC card or the module is a computer system constituted by a microprocessor, a ROM, a RAM, and so forth. The IC card or the module may include the super-multifunctional LSI described above. The microprocessor operates in accordance with a computer program, thereby allowing the IC card or the module to achieve its function. The IC card or the module may be tamper-resistant.

Further, as an aspect of the present invention, the respective computer programs or digital signals described above may be recorded on a computer-readable recording medium such as a flexible disk, a hard disk, a CD-ROM, an MO, a DVD, a DVD-ROM, a DVD-RAM, a BD (Blu-ray (registered trademark) Disc), or a semiconductor memory. Furthermore, an aspect of the present invention may be the digital signal that is recorded on such recording media. In addition, as an aspect of the present invention, the computer program or the digital signal may be transmitted via a telecommunication line, a wireless or wired communication line, a network that is represented by the Internet, data broadcasting, or the like.

A further aspect of the present invention is a computer system including a microprocessor and a memory, in which the memory has recorded thereon the computer program described above and the microprocessor operates in accordance with the computer program. Moreover, the program or the digital signal may be recorded on a recording medium and transported, or the program or the digital signal may be transported via a network or the like, so as to be executed by any other independent computer system.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

Further Information about Technical Background to this Application

The disclosures of the following Japanese Patent Applications including specification, drawings and claims are incorporated herein by references on their entirety: Japanese Patent Application No. 2018-104986 filed on May 31, 2018 and Japanese Patent Application No. 2018-105049 filed on May 31, 2018.

INDUSTRIAL APPLICABILITY

The present invention can be applied for dealing with an attack that transmits a frame of a false driving control instruction to a movable body network provided in a movable body, such as a vehicle, in which driving control is executed manually or automatically.

The invention claimed is:
1. An electronic control device, comprising:
an acquisition unit configured to acquire state information indicating at least one state of a state of a movable body or a state of an external environment in which the movable body is moving, and a control instruction indicating at least one instruction of a steering control instruction for steering the movable body or an acceleration control instruction for adjusting acceleration of the movable body; and
a determining unit configured to determine whether the control instruction is a false control instruction by comparing the at least one state indicated by the state information with control indicated by the control instruction, the false control instruction being made by an attacker and being different from a normal control instruction transmitted by at least one of the electronic control device or an electronic control unit,
wherein the determining unit determines that the control instruction is the false control instruction when the state indicated by the state information is inconsistent with the control indicated by the control instruction.

2. The electronic control device according to claim 1, wherein
the acquisition unit is configured to acquire the control instruction as an acceleration control instruction.

3. The electronic control device according to claim 2, further comprising:
a disabling unit configured to disable or discard the acceleration control instruction in a case where the determining unit determines that the acceleration control instruction is the false control instruction.

4. The electronic control device according to claim 2, wherein
the determining unit determines that the acceleration control instruction is the false control instruction in a case where the acceleration control instruction indicates control which is not consistent with the at least one state indicated by the state information.

5. The electronic control device according to claim 4, wherein
the determining unit determines that the acceleration control instruction is the false control instruction in a case where the at least one state indicated by the state information indicates a set speed of the movable body or a regulation speed at a place that the movable body is moving, and the acceleration control instruction indicates control which causes the movable body to move at a speed exceeding the set speed or the regulation speed.

6. The electronic control device according to claim 4, wherein
the determining unit determines that the acceleration control instruction is the false control instruction in a case where the at least one state indicated by the state information indicates a vehicle speed of the movable body or a relative speed with respect to an object that is in a traveling direction of the movable body, and the acceleration control instruction indicates control which causes the movable body to move at a speed exceeding a first predetermined value.

7. The electronic control device according to claim 4, wherein
the determining unit determines that the acceleration control instruction is the false control instruction in a case where the at least one state indicated by the state information indicates a distance to an object that is in a direction of travel of the movable body, and the acceleration control instruction indicates control which causes the movable body to move at a speed exceeding a first predetermined value that corresponds to the distance to the object.

8. The electronic control device according to claim 4, wherein
the determining unit determines that the acceleration control instruction is the false control instruction in a case where the acceleration control instruction indicates control for causing the movable body to accelerate, and the at least one state indicated by the state information indicates a state that the movable body should be caused to decelerate.

9. The electronic control device according to claim 4, wherein
the determining unit determines that the acceleration control instruction is the false control instruction in a case where the at least one state indicated by the state information indicates that information the movable body uses to determine speed control has been received from a preceding movable body with respect to the movable body, and the acceleration control instruction indicates control which is not consistent with the speed control.

10. The electronic control device according to claim 4, wherein
the determining unit determines that the acceleration control instruction is the false control instruction in:
(1) a case where the at least one state indicated by the state information indicates that an advanced driver assistance system provided in the movable body is off, and the acceleration control instruction indicates control that causes the movable body to move at a speed exceeding a predetermined value, or
(2) a case where the at least one state indicated by the state information indicates that the advanced driver assistance system provided in the movable body is off, and the acquisition unit acquires the acceleration control instruction within a predetermined time period.

11. The electronic control device according to claim 1, wherein
the acquisition unit is configured to acquire a steering control instruction as the control instruction.

12. The electronic control device according to claim 11, further comprising:
a disabling unit configured to disable or discard the steering control instruction in a case where the determining unit determines that the steering control instruction is the false control instruction.

13. The electronic control device according to claim 11, wherein
the determining unit determines that the steering control instruction is the false control instruction in a case where the steering control instruction indicates control which is not consistent with the at least one state indicated by the state information.

14. The electronic control device according to claim 13, wherein
the determining unit determines that the steering control instruction is the false control instruction in
(1) a case where the at least one state indicated by the state information indicates a state that the movable body should move in a first direction, and the steering control instruction indicates control that causes the movable body to move in a second direction that is different from the first direction,
(2) a case where the at least one state indicated by the state information indicates a state that the movable body should be steered by a steering amount that is less than or equal to a first predetermined value, and the steering control instruction indicates control for a steering amount that is greater than the first predetermined value, or
(3) a case where the at least one state indicated by the state information indicates a state that the movable body should be steered by a steering amount that is greater than or equal to a second predetermined value, and the steering control instruction indicates control for a steering amount that is less than the second predetermined value.

15. The electronic control device according to claim 13, wherein
the determining unit determines that the steering control instruction is the false control instruction in:
(1) a case where the at least one state indicated by the state information indicates a state that the movable body should be moved by manual steering, and the steering control instruction indicates control for a steering amount that is outside a first predetermined range,
(2) a case where the at least one state indicated by the state information indicates a state that the movable body should be moved by manual steering, and the acquisition unit acquires the steering control instruction within a first predetermined time period,
(3) a case where the at least one state indicated by the state information indicates a state that the movable body should be moved by automatic steering, and the steering control instruction indicates control for a steering amount that is outside a second predetermined range, or
(4) a case where the at least one state indicated by the state information indicates a state that the movable body should be moved by automatic steering, and the acquisition unit fails to acquire the steering control instruction within a second predetermined time period.

16. The electronic control device according to claim 11, wherein
the state information indicates a state relating to a lane keeping function of the movable body, and
the determining unit determines that the steering control instruction is the false control instruction in:
(1) a case where the state information indicates that the lane keeping function is off, and the steering control instruction indicates control for a steering amount that is outside a first predetermined range,
(2) a case where the state information indicates that the lane keeping function is on and indicates a travel route of the movable body according to the lane keeping function, and the steering control instruction indicates control that specifies steering control that causes the movable body to deviate from the travel route, or (3) a case where the state information indicates that the lane keeping function is on and indicates a speed of the movable body, and the steering control instruction indicates control for a steering amount that is outside a second predetermined range.

17. The electronic control device according to claim 11, wherein the state information indicates a state relating to a parking assistance function of the movable body, and the determining unit determines that the steering control instruction is the false control instruction in a case where the state information indicates a target parking position of the movable body according to the parking assistance function, and the steering control instruction indicates control that causes the movable body to move in a direction that is different from a direction toward the target parking position.

18. The electronic control device according to claim 11, wherein the state information indicates a state relating to a lane changing function of the movable body, and the determining unit determines that the steering control instruction is the false control instruction in:

(1) a case where the state information indicates a state that a traffic lane in which the movable body moves should be changed to an adjacent traffic lane in a first direction, and the steering control instruction indicates control that causes the movable body to move in a second direction that is different from the first direction, or (2) a case where the state information indicates a state that a traffic lane in which the movable body moves should be changed, and the steering control instruction indicates control that specifies a steering amount that keeps the movable body in the traffic lane in which the movable body is moving.

19. The electronic control device according to claim 1, wherein the false control instruction is transmitted by the attacker and is different from the normal control instruction transmitted by the at least one of the electronic control device or the electronic control unit.

20. A non-transitory computer-readable recording medium for use in a computer, the non-transitory computer-readable recording medium having a computer program recorded thereon for causing the computer to execute:

acquiring state information indicating at least one state of a state of a movable body or a state of an external environment in which the movable body is moving, and a control instruction indicating at least one instruction of a steering control instruction for steering the movable body or an acceleration control instruction for adjusting acceleration of the movable body; and determining whether the control instruction is a false control instruction by comparing the at least one state indicated by the state information with control indicated by the control instruction, the false control instruction being made by an attacker and being different from a normal control instruction transmitted by at least one of the computer or an electronic control unit, wherein, in the determining, the control instruction is determined to be the false control instruction when the state indicated by the state information is inconsistent with the control indicated by the control instruction.

21. A gateway device, comprising:

an acquisition unit configured to acquire state information indicating at least one state of a state of a movable body or a state of an external environment in which the movable body is moving, and a control instruction indicating at least one instruction of a steering control instruction for steering the movable body or an acceleration control instruction for adjusting acceleration of the movable body;

a determining unit configured to determine whether the control instruction is a false control instruction by comparing the at least one state indicated by the state information with control indicated by the control instruction, the false control instruction being made by an attacker and being different from a normal control instruction transmitted by at least one of the gateway device or an electronic control unit; and a disabling unit configured to avoid transferring the control instruction in a case where the determining unit determines that the control instruction is the false control instruction, wherein the determining unit determines that the control instruction is the false control instruction when the state indicated by the state information is inconsistent with the control indicated by the control instruction.

* * * * *